US012353151B2

(12) United States Patent
Yano

(10) Patent No.: US 12,353,151 B2
(45) **Date of Patent: *Jul. 8, 2025**

(54) PRINTING SYSTEM, METHOD, AND STORAGE MEDIUM

(71) Applicant: CANON KABUSHIKI KAISHA, Tokyo (JP)

(72) Inventor: Takaaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,138

(22) Filed: Oct. 9, 2023

(65) Prior Publication Data

US 2024/0045361 A1 Feb. 8, 2024

Related U.S. Application Data

(63) Continuation of application No. 17/737,813, filed on May 5, 2022, now Pat. No. 11,815,837.

(30) Foreign Application Priority Data

May 12, 2021 (JP) ................................ 2021-081295

(51) Int. Cl.
*G03G 15/00* (2006.01)
*G03G 15/16* (2006.01)

(52) U.S. Cl.
CPC ..... *G03G 15/5016* (2013.01); *G03G 15/1675* (2013.01); *G03G 15/5062* (2013.01); *G03G 15/6561* (2013.01)

(58) Field of Classification Search
CPC ........... G03G 15/1675; G03G 15/5016; G03G 15/502; G03G 15/5062
See application file for complete search history.

(56) References Cited

U.S. PATENT DOCUMENTS

| | | | | |
|---|---|---|---|---|
| 11,815,837 | B2 * | 11/2023 | Yano | G03G 15/5062 |
| 2018/0253023 | A1 * | 9/2018 | Imai | G03G 15/502 |
| 2021/0302878 | A1 * | 9/2021 | Ando | G03G 15/1685 |

FOREIGN PATENT DOCUMENTS

| | | |
|---|---|---|
| JP | 2018126896 A | 8/2018 |

OTHER PUBLICATIONS

Machine Translation of JP 2018-126896. Aug. 16, 2018. (Year: 2018).*

* cited by examiner

*Primary Examiner* — Carla J Therrien
(74) *Attorney, Agent, or Firm* — Canon U.S.A., Inc. IP Division

(57) ABSTRACT

A printing system includes a printing unit configured to print an image on a sheet, a receiving unit configured to receive an adjustment value from a user, first and second adjustment units, and a control unit. The first adjustment unit conveys the sheet on which the image is printed by the printing unit to a reading apparatus, and performs a first adjustment based on an image read by the reading apparatus. The second adjustment unit performs a second adjustment based on the adjustment value received by the receiving unit. The control unit prevents the first adjustment from being performed for a sheet of a size where the first adjustment is not properly performed among sheets for the printing unit to print an image on. The control unit does not prevent the second adjustment from being performed for the sheet of the size where the first adjustment is not properly performed.

7 Claims, 20 Drawing Sheets

FIG.8

800

| 801 SHEET ID | 802 SHEET NAME | 803 GRAMMAGE | 804 SIZE | 805 WIDTH | 806 HEIGHT | 807 SURFACE PROPERTY | 808 SECONDARY TRANSFER VOLTAGE | | 809 IMAGE POSITION ADJUSTMENT (X) | | 810 IMAGE POSITION ADJUSTMENT (Y) | | 811 ADJUSTMENT FLAG |
|---|---|---|---|---|---|---|---|---|---|---|---|---|---|
| | | | | | | | FRONT | BACK | FRONT | BACK | FRONT | BACK | ADJUSTED (1) NOT ADJUSTED (0) |
| 1 | SHEET A | 216 | A4 | 297 | 210 | HIGH-QUALITY PAPER | 1 | 0 | 0.5 | 0 | 0 | 0 | 1 |
| 2 | SHEET B | 148 | A4R | 210 | 297 | HIGH-QUALITY PAPER | -1 | 1 | 0 | 0 | -0.1 | -0.3 | 1 |
| 3 | SHEET C | 90 | 11x17 | 279.4 | 431.8 | RECYCLED PAPER | 5 | 3 | 0 | 0 | 0 | 0 | 1 |
| 4 | SHEET D | 90 | A3 | 297 | 420 | MATTE COATED | 2 | -2 | 1.2 | 1.2 | 1.5 | 1.7 | 1 |
| 5 | SHEET E | 350 | A3 | 297 | 420 | EMBOSSED | 0 | 1 | -0.8 | -0.5 | -0.5 | -0.5 | 1 |
| 6 | SHEET F | 80 | A4 | 297 | 210 | HIGH-QUALITY PAPER | 0 | 0 | 0 | 0 | 0 | 0 | 0 |
| ... | ... | ... | ... | ... | ... | ... | ... | ... | ... | ... | ... | ... | ... |

FIG.16A

| TYPE | SECONDARY TRANSFER VOLTAGE ADJUSTMENT |
|---|---|
| HIGH-QUALITY PAPER | ○ |
| RECYCLED PAPER | ○ |
| COATED PAPER | ○ |
| FILM | × |
| . . . | . . . |

FIG.16B

| SIZE | SECONDARY TRANSFER VOLTAGE ADJUSTMENT | |
|---|---|---|
| | MANUAL ADJUSTMENT | AUTOMATIC ADJUSTMENT |
| A5 | ○ | × |
| A5R | × | × |
| A4 | ○ | ○ |
| A4R | ○ | × |
| A3 | ○ | ○ |
| POSTCARD | ○ | × |
| . . . | . . . | . . . |

PRINTING SYSTEM, METHOD, AND STORAGE MEDIUM

The present application is a continuation of U.S. patent application Ser. No. 17/737,813, filed on May 5, 2022, which claims priority from Japanese Patent Application No. 2021-081295, filed May 12, 2021, all of which are hereby incorporated by reference herein in their entireties.

BACKGROUND

Field

The present disclosure relates to a printing system, a method, and a storage medium.

Description of the Related Art

There is a printing system that adjusts a secondary transfer voltage by printing an image on a sheet, which is set on a reading apparatus by a user, and then reading the sheet (see Japanese Patent Application Laid-Open No. 2013-37185).

There is also a conventional printing system that adjusts a secondary transfer voltage by printing an image on a sheet, conveying the sheet to a reading apparatus, and reading the image on the sheet using the reading apparatus. This can save the user's time and labor for adjustment.

In making an adjustment by conveying a sheet to the reading apparatus, a sheet having the same size as that of sheets to be used for printing is desirably used. Thus, the user selects a sheet to be used for adjustment from a plurality of sheets.

However, some reading apparatuses can make a proper adjustment only with limited sizes of sheet due to limitations in mechanical structures and reading methods of the reading apparatuses for reading sheets.

The secondary transfer voltage cannot be properly adjusted if a sheet of a size where a proper adjustment cannot be made is selected.

SUMMARY

According to an aspect of the present disclosure, a printing system includes a printing unit configured to print an image on a sheet, a receiving unit configured to receive an adjustment value from a user, a first adjustment unit configured to convey the sheet on which the image is printed by the printing unit to a reading apparatus, and to perform a first adjustment based on an image read by the reading apparatus, a second adjustment unit configured to perform a second adjustment based on the adjustment value received by the receiving unit, and a control unit configured to prevent the first adjustment from being performed for a sheet of a size where the first adjustment is not properly performed among sheets for the printing unit to print an image on, wherein the control unit is configured not to prevent the second adjustment from being performed for the sheet of the size where the first adjustment is not properly performed.

Further features of the present disclosure will become apparent from the following description of exemplary embodiments with reference to the attached drawings.

BRIEF DESCRIPTION OF THE DRAWINGS

FIG. 8 is a diagram illustrating an example of a sheet setting management table stored in the print control apparatus according to the first exemplary embodiment.

FIGS. 16A and 16B are diagrams illustrating examples of secondary transfer voltage adjustable sheet tables according to the first exemplary embodiment.

DESCRIPTION OF THE EMBODIMENTS

Exemplary embodiments of the present disclosure will be described below with reference to the drawings.

Figure 1:
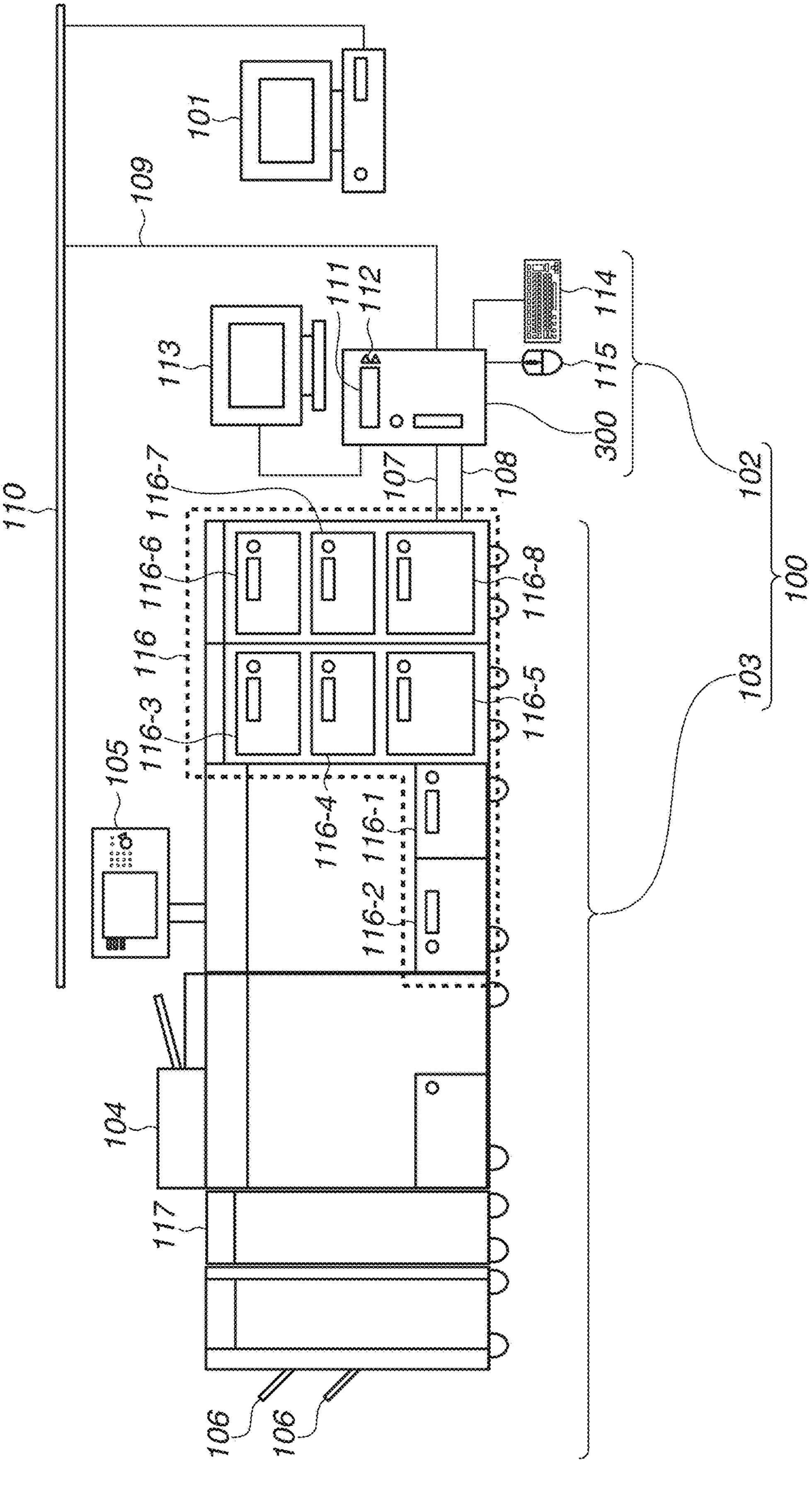
FIG. 1 is a block diagram illustrating an overall configuration of a printing system according to a first exemplary embodiment.

FIG. 1 is a block diagram illustrating an overall configuration of a printing system 100 according to a first exemplary embodiment. The printing system 100 includes an image forming apparatus 103 and a print control apparatus 102.

The printing system 100 is communicably connected to a client computer 101. The client computer 101 and the print control apparatus 102 are communicably connected via a local area network (LAN) 110 using an Ethernet cable 109. The print control apparatus 102 and the image forming apparatus 103 are connected via an image video cable 107 and a control cable 108. In the present exemplary embodiment, the image forming apparatus 103 is not directly connected to the LAN 110. The image forming apparatus 103 and the client computer 101 communicate via the print control apparatus 102. However, the image forming apparatus 103 may be connected to the LAN 110. In other words, the image forming apparatus 103 may be directly communicably connected to the client computer 101. The client computer 101 runs an application and issues a print instruction to the printing system 100. The print control apparatus 102 performs image processing in cooperation with the image forming apparatus 103.

The image forming apparatus 103 is a multifunction peripheral having various functions. The image forming apparatus 103 can not only process images from the client computer 101 and the print control apparatus 102, but also copy data read by a scanner unit 104 and transmit the data to a shared folder. In scanning an image using the scanner unit 104, the image forming apparatus 103 accepts various instructions from a user via various keys on an operation panel 105. The operation panel 105 displays various types of information including a scan state. Discharge units 106 receive image-formed sheets discharged.

The print control apparatus 102 includes a control unit (controller 300 to be described below) and a display unit 111. The display unit 111 displays information about the print control apparatus 102. The user operates a hardware operation button unit 112 of the print control apparatus 102 to operate the information displayed on the display unit 111. The information displayed on the display unit 111 is used for the purpose of displaying minimum information for operating the print control apparatus 102 (operating the power supply and checking an Internet Protocol (IP) address). An external display device 113, a keyboard 114, and a pointing device 115 are also connected to the print control apparatus 102. While, in the first exemplary embodiment, the printing system 100 is described to include the print control apparatus 102 and the image forming apparatus 103 as separate apparatuses, the processing of the print control apparatus 102 may be implemented in the image forming apparatus 103 without the physical print control apparatus 102. The external display device 113 may have a position input device function as in a touchpad, and function as the pointing device 115 as well.

Feed units 116-1 to 116-8 (referred to collectively as feed units 116) connected to the image forming apparatus 103 are devices where sheets to be used for printing are stored. If a print instruction is given, one of the feed stages (units) 116 is selected and a sheet is fed from the selected feed stage 116. The number of feed units 116 depends on the configuration of optional devices connected to the image forming apparatus 103.

A reading apparatus 117 includes a built-in sensor for reading a chart printed to make various adjustments such as an image position (printing position) adjustment, density unevenness correction, and secondary transfer voltage adjustment. The reading apparatus 117 notifies the controller 300 of the reading result.

Figure 2:
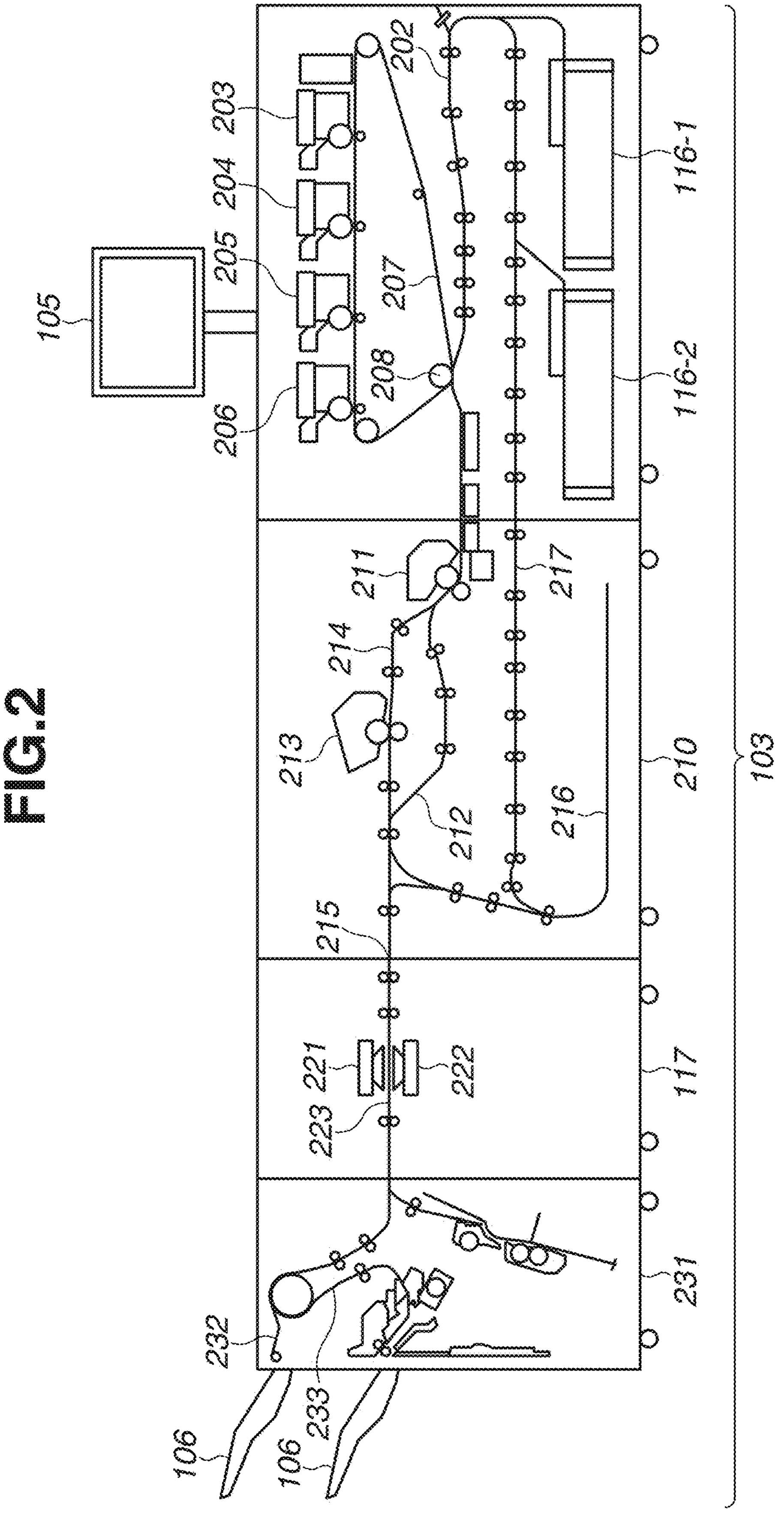
FIG. 2 is a sectional view of an image forming apparatus according to the first exemplary embodiment.

FIG. 2 is a mechanical sectional view of the image forming apparatus 103 according to the first exemplary embodiment (with the feed units 116-3 to 116-8 omitted). A description will be given below with reference to FIG. 2.

A print engine 210 includes the feed units 116-1 to 116-8. Various sheets can be stored in each of the feed units. The feed units 116-1 to 116-8 separate only the topmost one of the stored sheets and convey the sheet to a sheet conveyance path 202. Developing stations 203, 204, 205, and 206 form a toner image using yellow (Y), magenta (M), cyan (C), and black (K) color toners, respectively. First, the formed toner images are primarily transferred to an intermediate transfer belt 207. The intermediate transfer belt 207 rotates clockwise in FIG. 2, and the toner images are transferred to the sheet conveyed from the sheet conveyance path 202 by a secondary transfer roller 208. A fixing unit 211 includes a pressure roller and a heating roller. The sheet is passed between the rollers to melt and press the toner, whereby the toner images are fixed to the sheet. The sheet past the fixing unit 211 is conveyed to a sheet conveyance path 215 through a sheet conveyance path 212. If additional melting and pressurization for fixing are desirable depending on a sheet type, the sheet past the fixing unit 211 is conveyed to a second fixing unit 213 through a sheet conveyance path 214. The sheet given the additional melting and pressurization in the second fixing unit 213 is conveyed to the sheet conveyance path 215. Here, if a print mode is set to two-sided printing, the sheet is conveyed to a sheet reversing path 216. The sheet is reversed and then conveyed to a two-sided conveyance path 217. Image transfer is then performed on a second side by the secondary transfer roller 208.

The sheet conveyed from the print engine 210 is conveyed to the reading apparatus 117. The reading apparatus 117 includes a first contact image sensor (CIS) 221 and a second CIS 222 that are located above and below a sheet conveyance path 223. While the present exemplary embodiment uses CISs, the mechanisms are not limited to CISs as long as patches or markers on a sheet can be read. The first CIS 221 reads the top side of the sheet, and the second CIS 222 the bottom side. The reading apparatus 117 reads the patches or markers on the sheet conveyed to the sheet conveyance path 223 using the first and second CISs 221 and 222 at timing when the sheet reaches a predetermined position. Then, the reading apparatus 117 feeds back a reading result of the patches or markers to the print engine 210 as image position information or density information accordingly. The handling of the reading result will be described below.

A finisher 231 performs finishing such as stapling (singe/double stapling), punching (two-hole/three-hole), and saddle stitching on conveyed sheets. The finisher 231 includes two trays (discharge units) 106. Sheets are discharged to the trays 106 through sheet conveyance paths 232 and 233.

The reading apparatus 117 is configured to be attachable and detachable to and from the print engine 210, and can be detached from and attached to the print engine 210.

Figure 3:
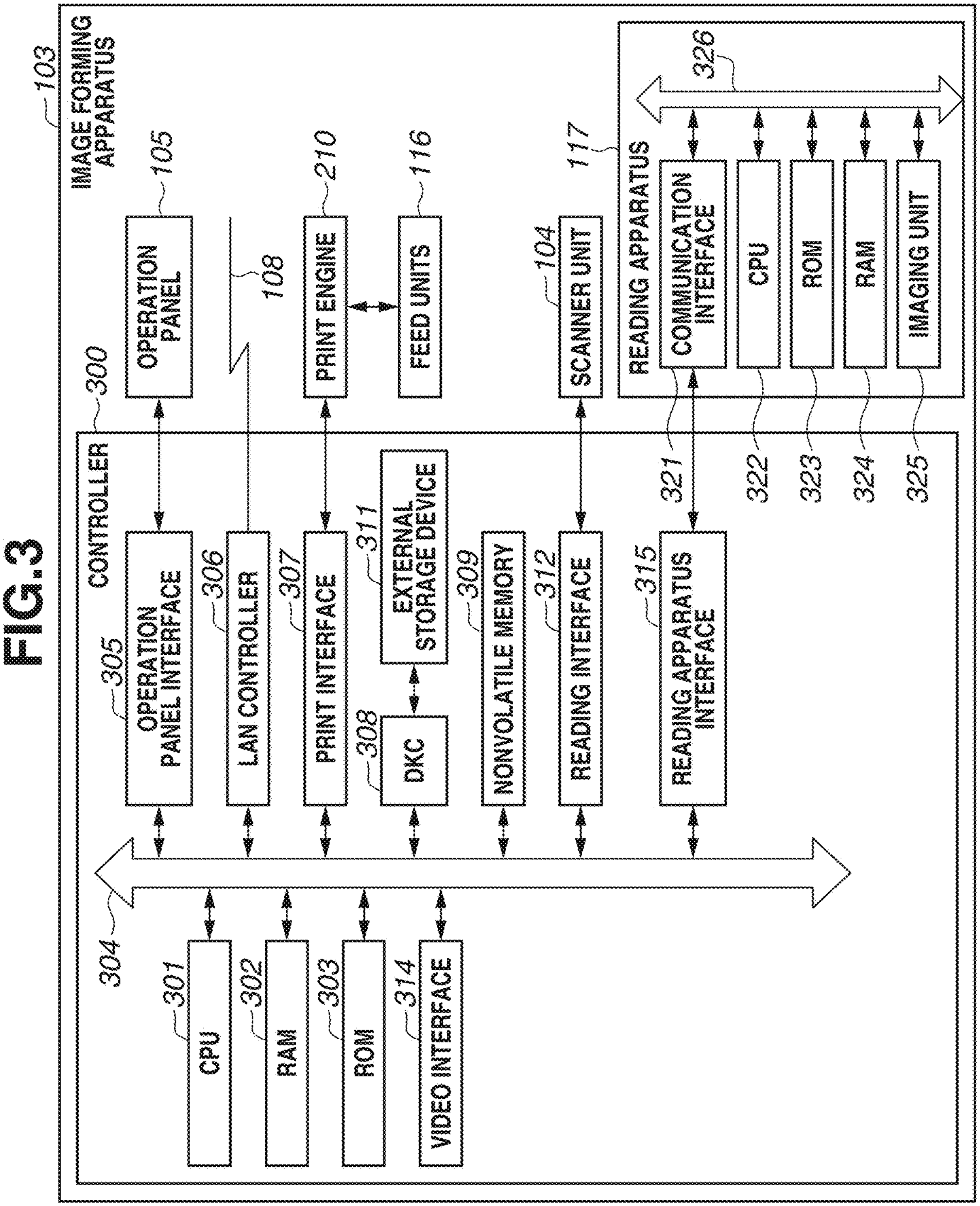
FIG. 3 is a block diagram illustrating a hardware configuration of the image forming apparatus according to the first exemplary embodiment.

FIG. 3 is a block diagram for describing a hardware configuration of the image forming apparatus 103 according to the first exemplary embodiment.

The controller 300 includes a central processing unit (CPU) 301. The CPU 301 loads a control program stored in a read-only memory (ROM) 303 or an external storage device 311 into a random access memory (RAM) 302, and executes the loaded program. The controller 300 thereby controls various devices connected to a system bus 304 in a centralized manner. The CPU 301 outputs an image signal serving as output information to the printing unit (print engine) 210 connected via a print interface 307, and receives an image signal input from the scanner unit 104 connected via a reading interface 312. The CPU 301 controls the feed units 116 connected to the print engine 210 and obtains the states of the feed units 116 via the print interface 307. The CPU 301 can communicate with the print control apparatus 102 via a LAN controller 306 and the control cable 108. The RAM 302 functions mainly as a main memory and a work area of the CPU 301. Access to the external storage device 311 is controlled by a disk controller (DKC) 308. Examples of the external storage device 311 include a hard disk drive (HDD) and an integrated circuit (IC) card. The external storage device 311 stores an application program, font data, and form data, and is used as a job storage area for temporarily spooling a print job and controlling the spooled job from outside. The external storage device 311 is also used as a box data storage area for storing image data input from the scanner unit 104 and image data on a print job as box data so that the image data can be referred to and printed over a network. In the first exemplary embodiment, an HDD is used as the external storage device 311, and stores various logs such as a job log and an image log. The operation panel 105 is connected to the controller 300 via an operation panel interface 305, and the user can input various types of information using software keys or hardware keys. A non-volatile memory 309 stores various types of setting information set from the operation panel 105 or from a terminal via the LAN 110. A video interface 314 receives image data from the print control apparatus 102. The CPU 301 obtains the image position information or density information read by the reading apparatus 117 connected via a reading apparatus interface 315 and a communication interface 321 of the reading apparatus 117. The reading apparatus 117 includes a CPU 322, a ROM 323, a RAM 324, and an imaging unit 325 connected to a system bus 326, controls reading of patches or markers, and transmits read image position information or density information to the print engine 210.

Figure 4A:
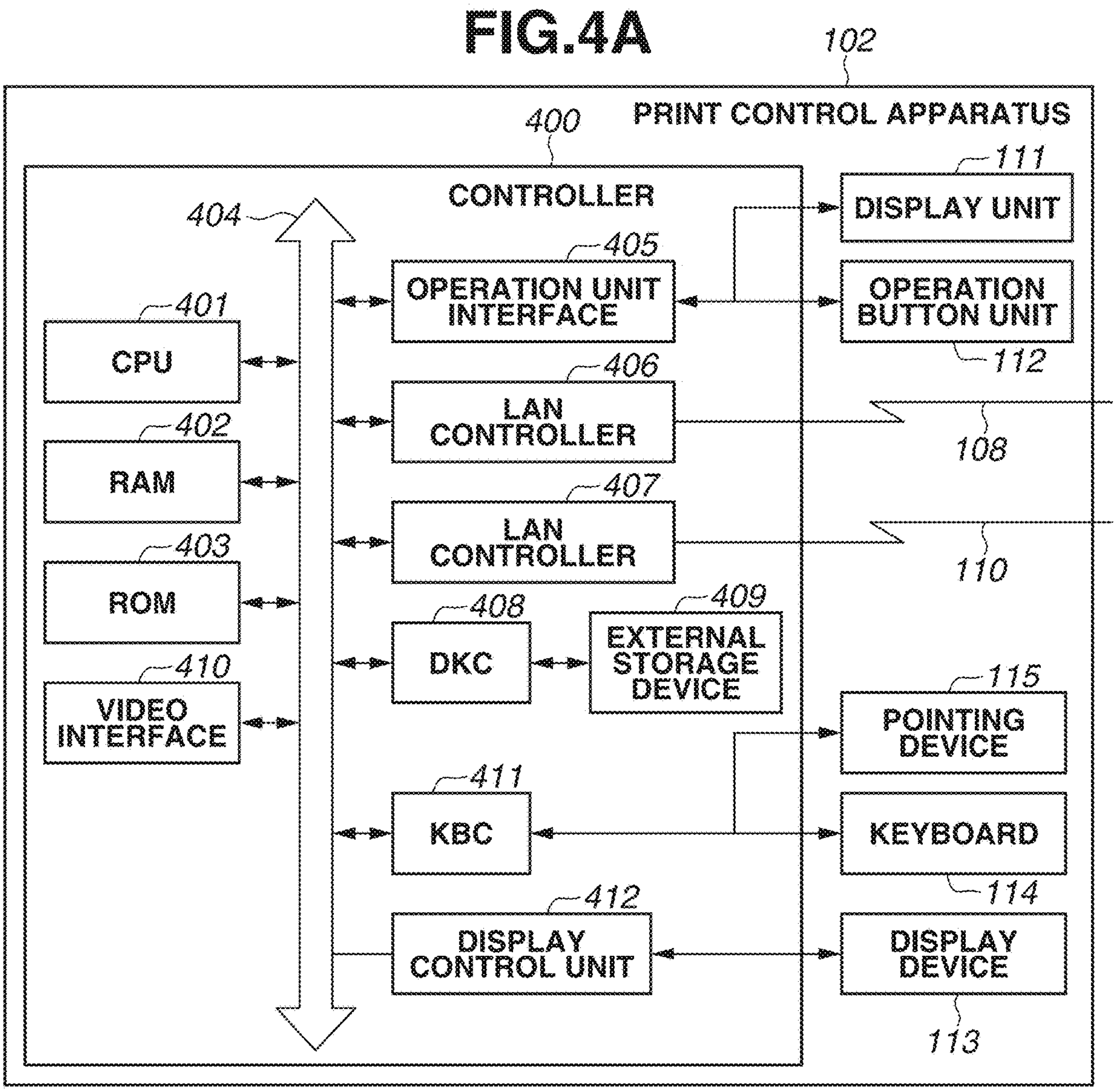
FIGS. 4A and 4B are block diagrams illustrating a hardware configuration and a software configuration, respectively, of a print control apparatus according to the first exemplary embodiment.

FIG. 4A is a block diagram illustrating a hardware configuration of the print control apparatus 102 according to the first exemplary embodiment.

A controller 400 includes a CPU 401. The CPU 401 loads a control program stored in a ROM 403 or an external storage device 409 into a RAM 402, and executes the loaded program. The controller 400 thereby controls various devices connected to a system bus 404 in a centralized manner. The CPU 401 can communicate with the image forming apparatus 103 via a LAN controller 406 and the control cable 108. The CPU 401 can communicate with the client computer 101 on the LAN 110 via a LAN controller 407 and the LAN 110. The RAM 402 functions mainly as a main memory and a work area of the CPU 401. Access to the external storage device 409 is controlled by a DKC 408. Examples of the external storage device 409 include an HDD and an IC card. The external storage device 409 stores an application program, font data, and form data, and temporarily spools a print job. The external storage device 409 is used as a job storage area for performing raster image processor (RIP) processing on the spooled job and storing the resulting data again. An operation unit interface 405 controls an interface of the controller 400 with the operation button unit 112 for the user to input various types of information and the display unit 111 for presenting information to the user. A video interface 410 transmits the RIP-processed image data to the image forming apparatus 103. A keyboard controller (KBC) 411 performs processing related to information input from the keyboard 114 and the pointing device 115. A display control unit 412 includes a video memory. The display control unit 412 renders image data on the video memory based on an instruction from the CPU 401, and outputs the image data rendered on the video memory to the display device 113 as a video signal.

Figure 4B:
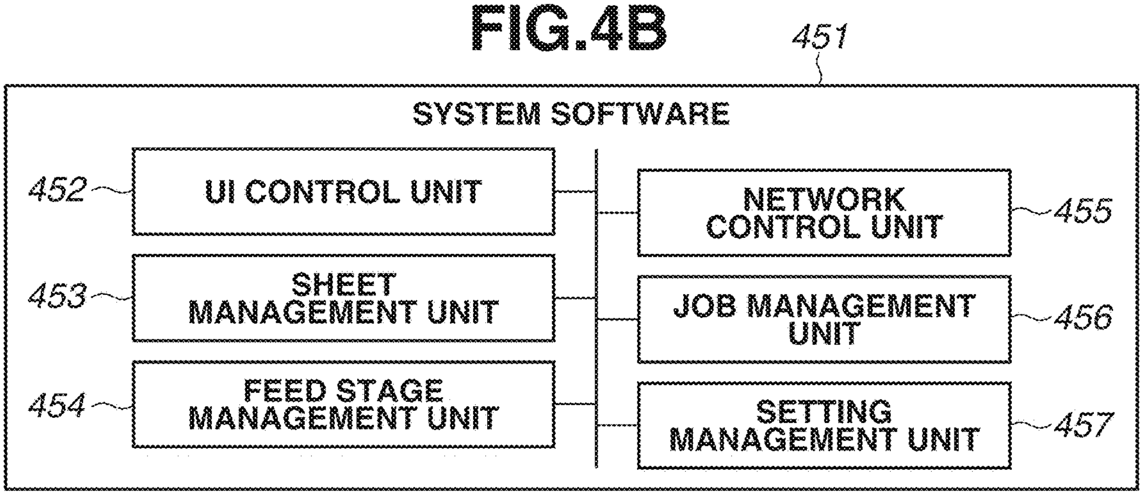

FIG. 4B is a block diagram illustrating a software configuration of the print control apparatus 102 according to the first exemplary embodiment. The functions of the units illustrated in FIG. 4B are implemented by the CPU 401 executing programs loaded into the RAM 402.

System software 451 for controlling the print control apparatus 102 includes a user interface (UI) control unit 452, a sheet management unit 453, a feed stage management unit 454, a network control unit 455, a job management unit 456, and a setting management unit 457. The UI control unit 452 controls screens displayed by the printing system 100. The UI control unit 452 can control switching of messages displayed on the screens and display of the system of units in which sheet sizes are displayed, based on system settings. The sheet management unit 453 communicates with the image forming apparatus 103 and manages obtained sheet information using a sheet setting management table 800 illustrated in FIG. 8.

The network control unit 455 controls communication with the image forming apparatus 103 via the LAN controller 406 and with the client computer 101 on the LAN 110 via the LAN controller 407. The job management unit 456 manages print processing sequences and job order. The job management unit 456 manages jobs received by the print control apparatus 102, and controls transfer of data to print the received jobs to the image forming apparatus 103 via the LAN controller 406 or the video interface 410. The setting management unit 457 manages system settings related to a sheet management system. Examples of the system settings include a language setting about messages displayed on a screen of the sheet management system, and a setting about the system of units in which sheet sizes are displayed (millimeters or inches).

Figure 5:
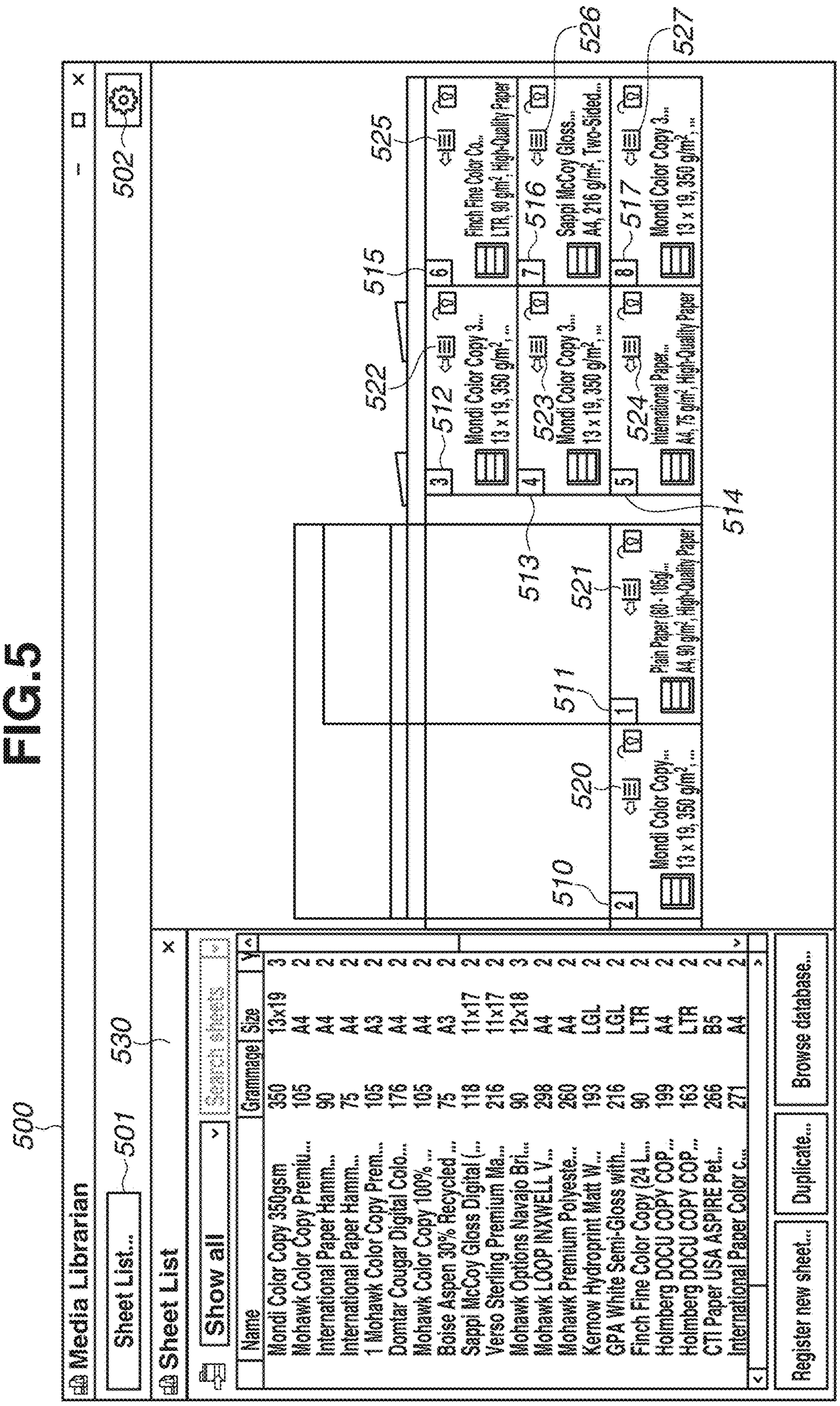
FIG. 5 is a diagram illustrating an example of a top screen of a sheet management application executed by the print control apparatus according to the first exemplary embodiment.

FIG. 5 is a diagram illustrating an example of a top screen 500 of a sheet management application executed by the print control apparatus 102 according to the first exemplary embodiment.

The top screen 500 is a screen example where information (feed stage information) about the feed stages of the image forming apparatus 103 connected to the print control apparatus 102 is displayed. The top screen 500 is displayed by rendering image data on the video memory based on an instruction from the CPU 401 and outputting the image data rendered on the video memory to the display device 113 as a video signal.

The sheet management application, when activated, obtains device configuration information about the image forming apparatus 103, and displays a proper image based on the device configuration information. In FIG. 5, a state is illustrated where eight feed stages are connected. Feed stage buttons 510 to 517 correspond to the respective feed stages.

Feed stage open buttons 520 to 527 are buttons for giving an instruction to open the corresponding feed stages. Specifically, if a feed stage is closed and its corresponding feed stage open button is pressed, the feed stage is opened. The sheet management application generates and displays the feed stage buttons 510 to 517 based on the information about the feed stages of the image forming apparatus 103, obtained upon activation. Each of the feed stage buttons includes an area for displaying information such as a sheet name and a remaining sheet level set for the feed stage, for example. If the state of a feed stage of the image forming apparatus 103 is changed and a feed stage state change event is received from the image forming apparatus 103, the controller 400 obtains the feed stage information again. Then, the controller 400 renders the display areas of the feed stage buttons 510 to 517 again based on the obtained feed stage information.

A sheet list button 501 is a button for giving an instruction to display a sheet list screen 530. In the first exemplary embodiment, if the sheet list button 501 is pressed, the controller 400 displays the sheet list screen 530 in the foreground.

A setting button 502 is a button for giving an instruction to display a screen for changing system settings of the sheet management application. If the setting button 502 is pressed, the controller 400 displays the current system settings based on the system settings stored in the external storage device 409.

Figure 6:
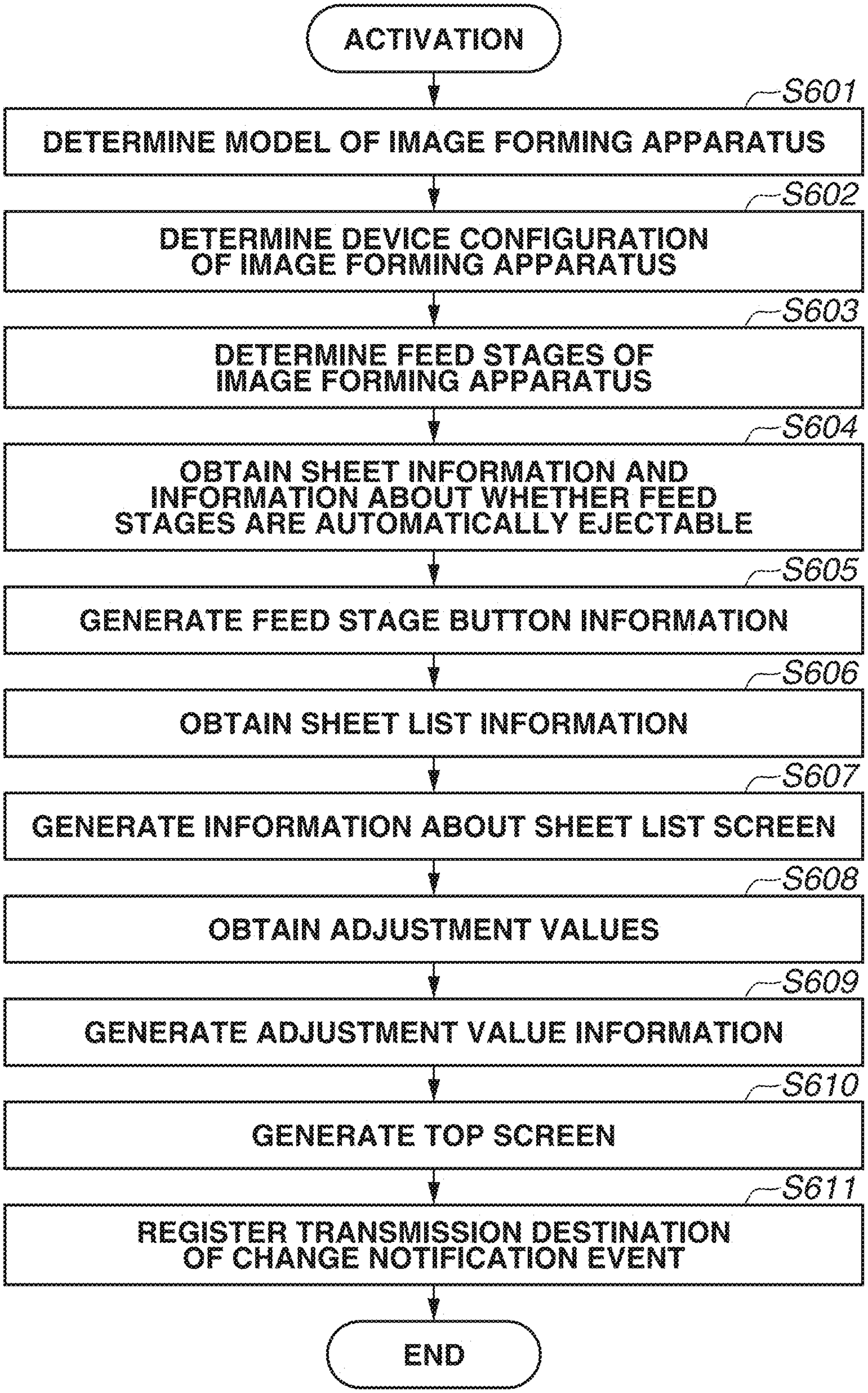
FIG. 6 is a flowchart illustrating processing for generating the top screen when the sheet management application is activated on the print control apparatus according to the first exemplary embodiment.

FIG. 6 is a flowchart illustrating processing for generating the top screen 500 when the sheet management application is activated on the print control apparatus 102 according to the first exemplary embodiment. While the sheet management application according to the first exemplary embodiment runs on the print control apparatus 102, this is not restrictive. For example, the sheet management application can similarly be run on the client computer 101. In the following example, the sheet management application is run on the print control apparatus 102. The processing illustrated by the flowchart is implemented by the CPU 401 executing the foregoing program loaded into the RAM 402.

The processing is started by activation of the print control apparatus 102. In step S601, the CPU 401 determines the model of the connected image forming apparatus 103 that is the target of sheet management. The CPU 401 determines the model of the image forming apparatus 103 here, and uses the determination result in generating a device configuration screen of the top screen 500 and smoothing out differences in specifications between different models. The CPU 401 here communicates with the image forming apparatus 103 and obtains model information from information returned from the image forming apparatus 103 in step S707 of FIG. 7 to be described below. Then, the CPU 401 determines the model of the image forming apparatus 103 based on model determination information stored in advance. With the model of the connected image forming apparatus 103 thus determined, the processing proceeds to step S602. In step S602, the CPU 401 communicates with the image forming apparatus 103 and obtains the device configuration information about the image forming apparatus 103 from information returned in step S709 of FIG. 7. Then, the CPU 401 determines the configuration of the devices connected to the image forming apparatus 103. The CPU 401 uses the determination result in generating the device configuration screen of the top screen 500, in identifying information about the feed stages, and in smoothing out differences in specifications between different models.

In step S603, the CPU 401 obtains the feed stage information about the image forming apparatus 103 from the image forming apparatus 103. The feed stage information includes the configurations of the feed stages such as a feed cassette, manual feed tray, and long sheet tray, and information about the sheets set in the respective feed stages. The CPU 401 also determines the feed stages connected to the image forming apparatus 103 that is the target of the sheet management, and identifies the number of feed stages connected. In step S604, the CPU 401 communicates with the image forming apparatus 103. The CPU 401 obtains sheet information set for the respective feed stages and information about whether the feed stages can be automatically ejected when the corresponding feed stage open buttons 520 to 527 are pressed, from information returned in step S711 of FIG. 7. In step S605, the CPU 401 generates information (feed stage button information) about the feed stage buttons 510 to 517 to be displayed on the top screen 500. In generating the feed stage button information, the CPU 401 generates and displays the feed stage open buttons 520 to 527 on the feed stage buttons 510 to 517 if the feed stage buttons 510 to 517 can be automatically ejected by pressing the feed stage open buttons 520 to 527.

Figure 7:
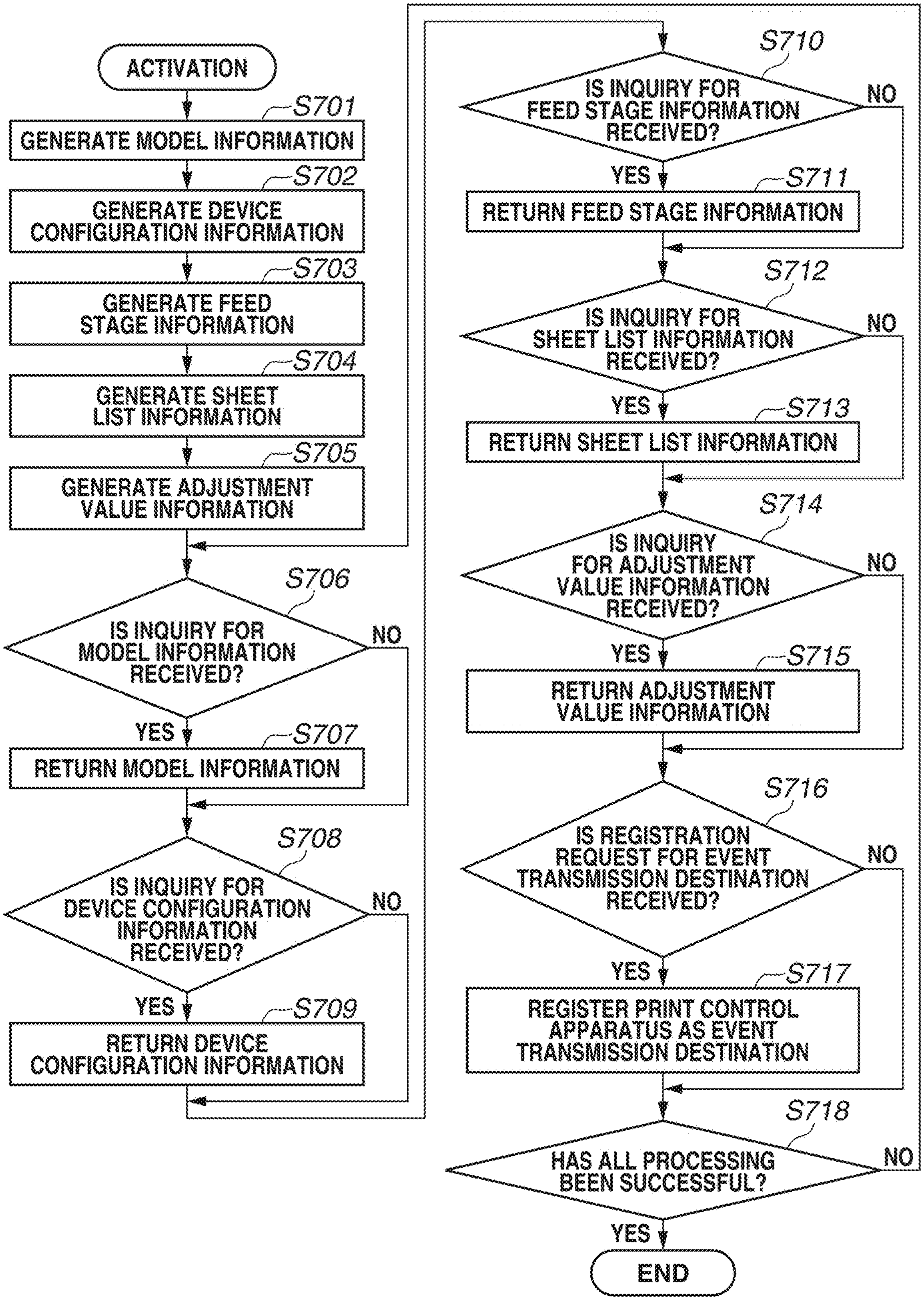
FIG. 7 is a flowchart illustrating initialization processing of the image forming apparatus according to the first exemplary embodiment.

In step S606, the CPU 401 communicates with the image forming apparatus 103 and obtains sheet list information returned from the image forming apparatus 103 in step S713 of FIG. 7. In step S607, the CPU 401 generates information about the sheet list screen 530 to be displayed on the top screen 500.

Pieces of sheet information in the sheet list screen 530 include sheet settability information about the feed stages of the image forming apparatus 103. In step S608, the CPU 401 communicates with the image forming apparatus 103 and obtains various adjustment values to be used to display adjustment value information on the sheet list screen 530 from information returned in step S715 of FIG. 7. In step S609, the CPU 401 generates character strings (adjustment value information) to be displayed as sheet information based on the adjustment values obtained in step S608. If an adjustment value has not been changed from its default value, "not adjusted" is displayed. If the adjustment value has been changed from its default value, "adjusted" is displayed. In step S610, the CPU 401 generates the top screen 500 based on the model of the image forming apparatus 103 and the device configuration information obtained in steps S601 and S602, the feed stage button information generated in step S605, the information about the sheet list screen 530 generated in step S607, and the adjustment value information generated in step S609. In step S611, the CPU 401 registers the print control apparatus 102 in the image forming apparatus 103 as the transmission destination of a change notification event. The change notification event is issued when the feed stage information or the sheet information about the image forming apparatus 103 is changed. If the transmission destination is successfully registered, the CPU 401 executes change notification event wait processing. With the change notification event wait processing executed, the activation processing ends.

The processing of FIG. 6 has been described as an operation upon activation of the sheet management application. However, the feed stage information, the sheet list information, and the adjustment values of the image forming apparatus 103 can be changed any time when the sheet management application is in use. Thus, the communication between the sheet management application and the image forming apparatus 103 and associated information update are performed as appropriate regardless of whether the operation is performed by the sheet management application or the image forming apparatus 103.

Thus, the information is synchronized between the sheet management application and the image forming apparatus 103.

FIG. 7 is a flowchart illustrating initialization processing of the image forming apparatus 103 according to the first exemplary embodiment. The processing illustrated in the flowchart is implemented by the CPU 301 executing the foregoing program loaded into the RAM 302.

First, in step S701, the CPU 301 obtains information about the model of the image forming apparatus 103 from the external storage device 311, and generates model information as data that can be returned. In step S702, the CPU 301 obtains information about the configuration of the devices connected to the image forming apparatus 103 from the external storage device 311, and generates device configuration information as data that can be returned. In step S703, the CPU 301 obtains information about the feed stages of the image forming apparatus 103 from the external storage device 311, and generates feed stage information as data that can be returned. In step S704, the CPU 301 obtains information about a sheet list of the image forming apparatus 103 from the external storage device 311, and generates sheet list information as data that can be returned. In step S705, the CPU 301 obtains information about the adjustment values of the image forming apparatus 103 from the external storage device 311, and generates adjustment value information as data that can be returned. As the adjustment value information, the CPU 301 obtains information about all the adjustable items of the image forming apparatus 103.

In step S706, the CPU 301 determines whether an inquiry for the model information is received from the print control apparatus 102. If an inquiry for the model information issued in step S601 of FIG. 6 is received (YES in step S706), the processing proceeds to step S707. In step S707, the CPU 301 returns the model information generated in step S701 to the print control apparatus 102. The processing proceeds to step S708. If, in step S706, no inquiry for the model information is received (NO in step S706), the processing proceeds to step S708.

In step S708, the CPU 301 determines whether an inquiry for the device configuration information is received from the print control apparatus 102. If an inquiry for the device configuration information issued in step S602 of FIG. 6 is received (YES in step S708), the processing proceeds to step S709. In step S709, the CPU 301 returns the device configuration information generated in step S702 to the print control apparatus 102. The processing proceeds to step S710. On the other hand, if, in step S708, no inquiry for the device configuration information is received (NO in step S708), the processing proceeds to step S710.

In step S710, the CPU 301 determines whether an inquiry for the feed stage information is received from the print control apparatus 102. If an inquiry for the feed stage information issued through steps S603 and S604 of FIG. 6 is received (YES in step S710), the processing proceeds to step S711. In step S711, the CPU 301 returns the feed stage information generated in step S703 to the print control apparatus 102. The processing proceeds to step S712. If, in step S710, no inquiry for the feed stage information is received (NO in step S710), the processing proceeds to step S712.

In step S712, the CPU 301 determines whether an inquiry for the sheet list information is received from the print control apparatus 102. If an inquiry for the sheet list information issued in step S606 of FIG. 6 is received (YES in step S712), the processing proceeds to step S713. In step S713, the CPU 301 returns the sheet list information generated in step S704 to the print control apparatus 102. The processing proceeds to step S714. If, in step S712, no inquiry for the sheet list information is received (NO in step S712), the processing proceeds to step S714.

In step S714, the CPU 301 determines whether an inquiry for the adjustment value information is received from the print control apparatus 102. If an inquiry for the adjustment value information issued in step S608 of FIG. 6 is received (YES in step S714), the processing proceeds to step S715. In step S715, the CPU 301 returns the adjustment value information generated in step S705 to the print control apparatus 102. The processing proceeds to step S716. If, in step S714, no inquiry for the adjustment value information is received (NO in step S714), the processing proceeds to step S716. In step S716, the CPU 301 determines whether a registration request for an event transmission destination is received from the print control apparatus 102. The event transmission destination refers to the destination to which a change notification event is transmitted when the state of the image forming apparatus 103 is changed. If the registration request for the event transmission destination is received (YES in step S716), the processing proceeds to step S717. In step S717, the CPU 301 registers the print control apparatus 102 as the event transmission destination. The processing proceeds to step S718. On the other hand, if, in step S716, no registration request for the event transmission destination is received (NO in step S716), the processing proceeds to step S718. In step S718, if all the processing of steps S706 to S717 has been successful (YES in step S718), the initialization processing ends. If not (NO in step S718), the processing proceeds to step S706.

The feed units 116 according to the first exemplary embodiment are just examples of the feed stages. Other feed stage mechanisms such as an inserter and a manual feed tray may be used without a limitation in mode.

The description returns to FIG. 5. If, for example, the feed stage button 510 for a feed stage 1 is specified using the pointing device 115, a sheet setting screen of the feed stage 1 appears, where the sheet setting of the feed stage 1 and the setting values of the set sheets can be changed. The same applies to the feed stage buttons 511 to 517, and a description thereof will thus be omitted. Although not described in detail in the exemplary embodiment, it will be understood that the feed stages include any type of feed stage such as an inserter and a manual feed tray. In the following description, a description of the use of the pointing device 115 in pressing a button or otherwise operating the sheet management application is omitted. However, it will be understood that such input devices are used for operation.

FIG. 8 is a diagram illustrating an example of the sheet setting management table 800 stored in the print control apparatus 102 according to the first exemplary embodiment.

A sheet name 802, grammage 803, size information such as a size 804, a width 805, and a height 806, surface property 807, and setting values 808 to 811 of a plurality of adjustment items are registered in the sheet setting management table 800 in association with a sheet identifier (ID) 801 for identifying a sheet. Examples of the setting values of the adjustment items include a secondary transfer voltage 808, image position adjustments 809 and 810, and an adjustment flag 811. The secondary transfer voltage 808 indicates the voltage applied to the secondary transfer roller 208, and may have different values between the front and back. The adjustment flag 811 indicates whether a sheet adjustment has been made. The adjustment flag 811 has a value of 1 when the sheet adjustment has been made, and 0 when not.

The sheet management unit 453 can perform edition, addition, deletion, and search of sheet information in the sheet setting management table 800. The sheet setting management table 800 is a management table for managing sheet information sheet ID by sheet ID, and is stored in the external storage device 409 that is a nonvolatile area. While the sheet setting management table 800 is described to be stored in the external storage device 409, the sheet setting management table 800 may be stored in the external storage device 311 of the image forming apparatus 103. In such a case, the print control apparatus 102 may obtain the sheet setting management table 800 from the image forming apparatus 103 and store the sheet setting management table 800 in the RAM 402 during program execution. The feed stage management unit 454 communicates with the image forming apparatus 103 and manages the obtained feed stage information.

Figure 9:
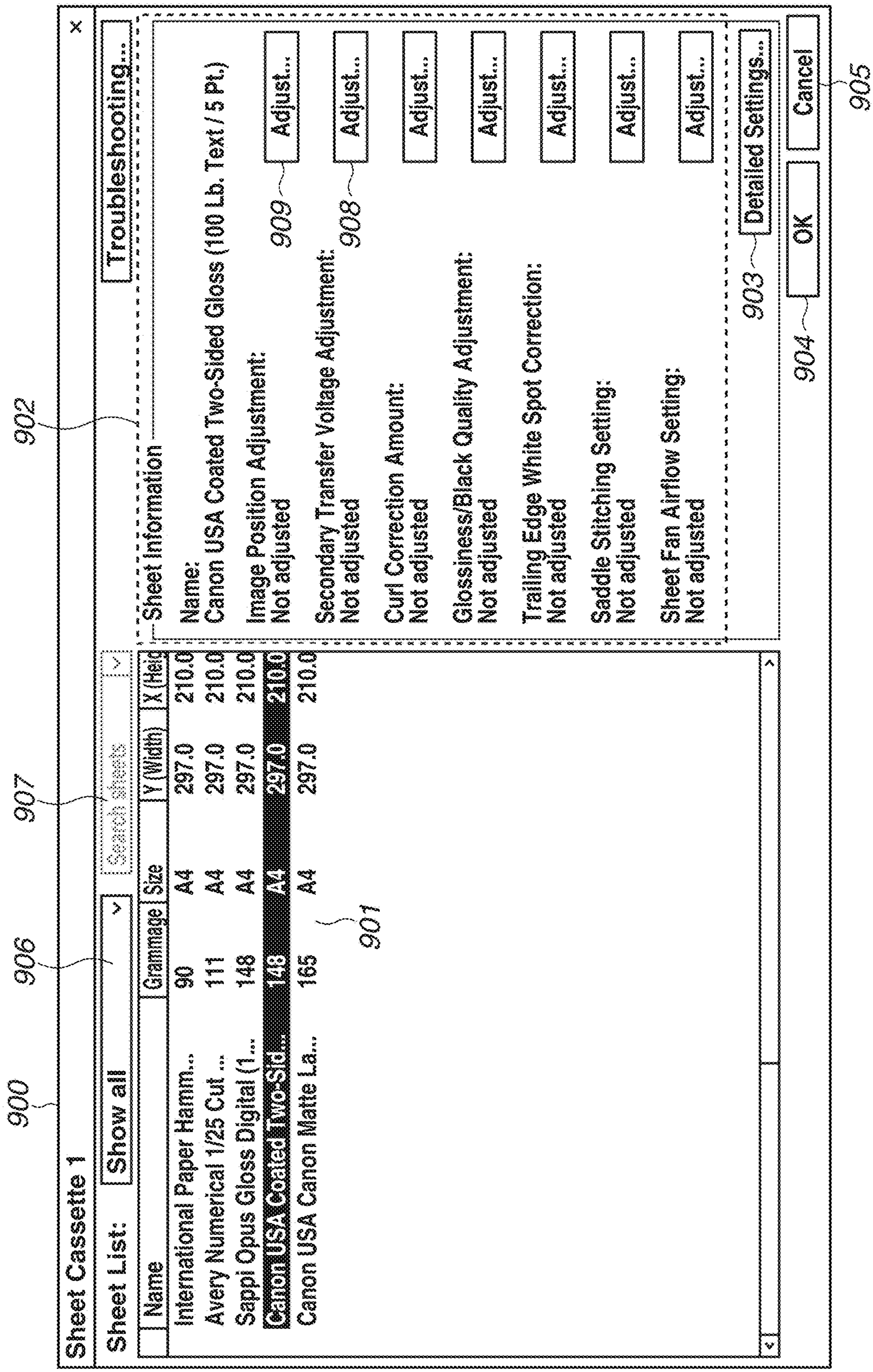
FIG. 9 is a diagram illustrating a feed stage screen displayed when a feed stage button on the top screen is pressed in the first exemplary embodiment.

FIG. 9 is a feed stage screen displayed when one of the feed stage buttons 510 to 517 on the top screen 500 is pressed in the first exemplary embodiment.

A feed stage screen 900 is displayed by rendering image data on the video memory based on an instruction from the CPU 401 and outputting the image data rendered on the video memory to the display device 113 as a video signal. The feed stage screen 900 includes a sheet list display area 901, a sheet information display area 902, a detailed adjustment button 903 for displaying a sheet information setting screen other than the sheet information display area 902, an OK button 904, and a cancel button 905. The feed stage screen 900 further includes a pull-down menu 906 for selecting a sheet list display method, and a sheet search input area 907.

The sheet list display area 901 is an area where a sheet list is displayed. Here, sheet types are displayed in a column direction, and sheet information such as sheet attributes is displayed in a row direction. A selected sheet is highlighted to indicate the selection. The feed stage screen 900 is displayed with the sheet set in the feed stage selected in the sheet list display area 901. If a sheet is selected from the sheet list display area 901, information about the selected sheet is displayed in the sheet information display area 902. If another sheet is selected in the sheet list display area 901 and the OK button 904 is pressed, the controller 400 makes sheet settings on the image forming apparatus 103. If another sheet is selected in the sheet list display area 901 and the cancel button 905 is pressed, the controller 400 closes the feed stage screen 900 without making sheet settings on the image forming apparatus 103.

Next, the items in the sheet information display area 902 will be described. As an example, in the first exemplary embodiment, only sheet information frequently used by the user is displayed for improved user convenience.

Specifically, the displayed sheet information includes the sheet name and various adjustment items (image position adjustment, secondary transfer voltage adjustment, curling correction amount, glossiness/black quality adjustment, trailing edge white spot correction, saddle stitching setting, and sheet fan airflow adjustment). The sheet information display area 902 displays the name of the currently selected sheet and whether various adjustment values have been changed from initial values of the image forming apparatus 103. If an adjustment value has not been changed, "not adjusted" is displayed. If an adjustment value has been changed, "adjusted" is displayed. For items adjustable from the print control apparatus 102, adjustment buttons are displayed so that corresponding adjustment screens can be displayed. The buttons are examples of objects. Checkboxes may be used aside from the buttons. An adjustment screen for a secondary transfer voltage adjustment to be described below can be displayed by pressing a secondary transfer voltage adjustment button 908 in the sheet information display area 902. An adjustment screen for an image position adjustment can be displayed by pressing an image position adjustment button 909 in the sheet information display area 902.

The detailed adjustment button 903 is pressed to check information or change settings not displayed in the sheet information display area 902.

The pull-down menu 906 for selecting the sheet list display method displays options for filtering and displaying sheets in the sheet list display area 901.

The sheet search input area 907 is an area for an operator to input a keyword for searching the sheets in the sheet list display area 901 for a desired sheet. The sheet search input area 907 is used to perform incremental search, and a search is automatically conducted each time a character is input.

Figure 10A:
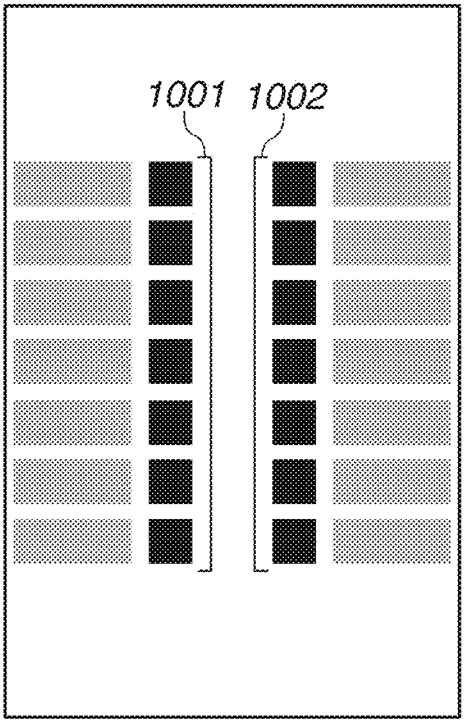
FIGS. 10A, 10B, 10C, and 10D illustrate examples of charts for secondary transfer voltage adjustment to be read by a reading apparatus according to the first exemplary embodiment.
Figure 10B:
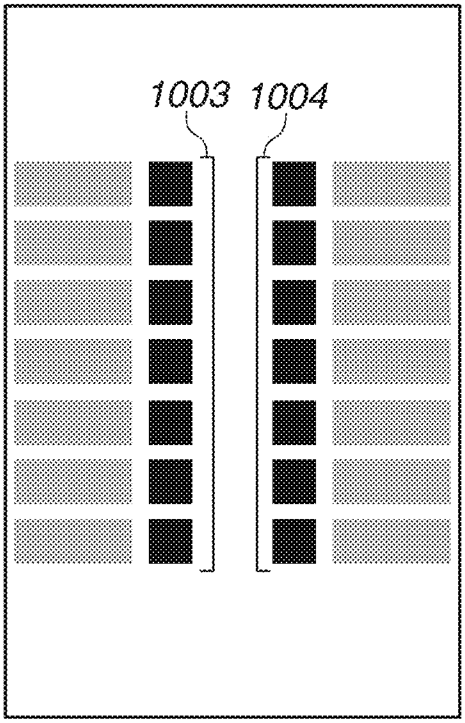
Figure 11:
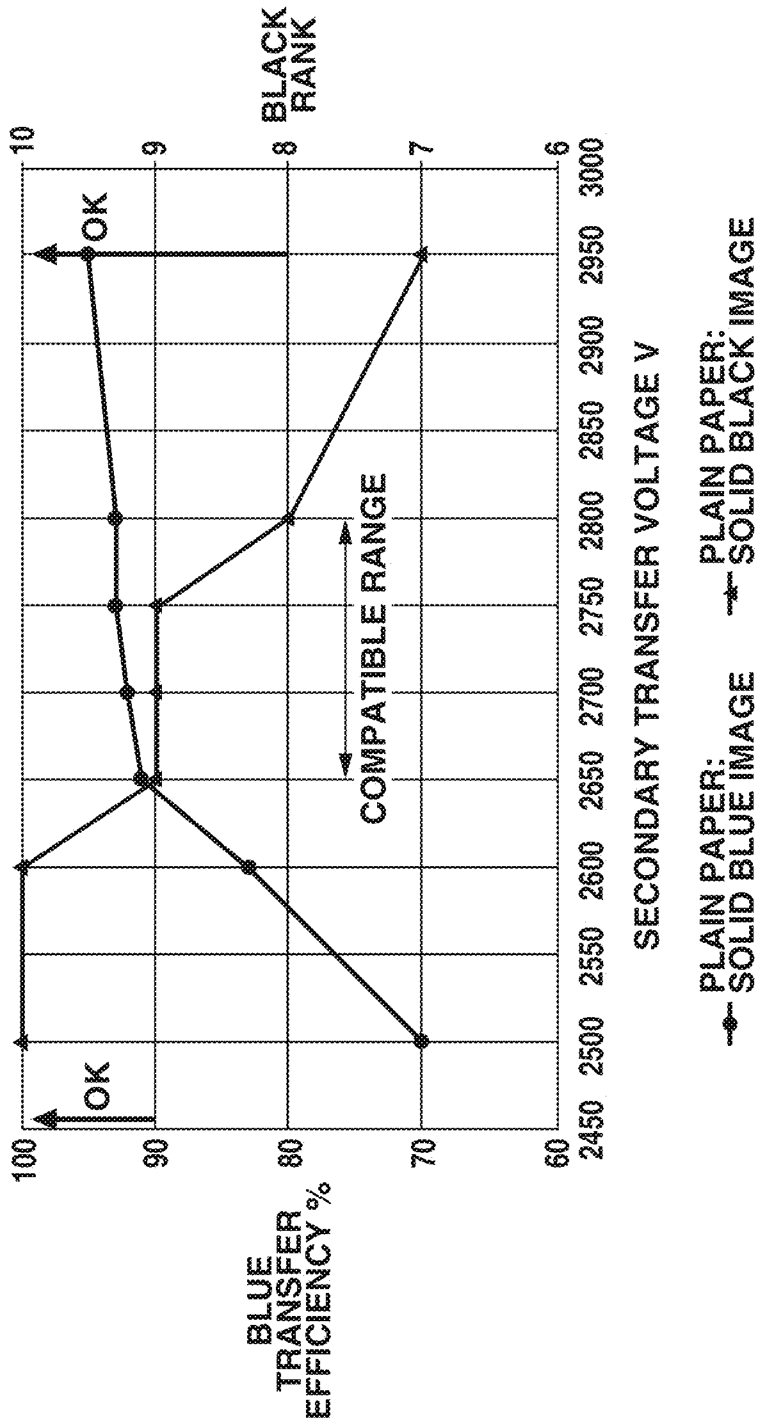
FIG. 11 illustrates examples of reading results of a chart for the secondary transfer voltage adjustment by the reading apparatus according to the first exemplary embodiment.

The secondary transfer voltage adjustment according to the present exemplary embodiment will be described. Depending on the type of sheet used by the user, optimum transfer can fail to be executed with a default secondary transfer voltage for the sheet if the amount of moisture or the resistance of the sheet differs greatly from that of standard paper. More specifically, a secondary transfer voltage at which toner on the intermediate transfer belt 207 can be transferred is desirably applied. The secondary transfer voltage is set to be low so that it can be further increased without causing an abnormal discharge. Depending on the state of the paper used by the user, the secondary transfer voltage may be increased because the resistance is high and the default voltage setting is too low to transfer toner. Some types of paper may lack moisture and easily cause a discharge, in which case the secondary transfer voltage is lowered since the default setting causes an image defect due to an abnormal discharge. For such a reason, an optimum secondary transfer voltage is desirably selected by outputting various secondary transfer voltages. In the present exemplary embodiment, the secondary transfer voltage is automatically adjusted by reading charts illustrated in FIGS. 10A and 10B using the reading apparatus 117, and adjusting the secondary transfer voltage so that transfer efficiency falls within a predetermined range. The charts illustrated in FIGS. 10A and 10B are obtained by executing a secondary transfer voltage automatic adjustment to be described below, i.e., by printing solid blue images 1001 and 1003 and solid black images 1002 and 1004 while changing the secondary transfer voltage that the print engine 210 applies to the secondary transfer roller 208 during printing. FIG. 10A illustrates a chart (referred to as a rough adjustment chart) printed by uniformly changing the secondary transfer voltage within the entire adjustable range of the secondary transfer voltage (here, from 1750 V to 3250 V in steps of 150 V). The rough adjustment chart is used to roughly adjust the secondary transfer voltage. For example, the rough adjustment chart is used before use of a sheet for which an adjustment is yet to be made. FIG. 10B illustrates a chart (referred to as a fine adjustment chart) obtained by printing the solid blue images 1003 and the solid black images 1004 while changing the secondary transfer voltage near a certain value in finer steps (here, from 2500 V to 3000 V in steps of 50 V). The fine adjustment chart is used in finely adjusting the secondary transfer voltage after the adjustment using the rough adjustment chart, or making a readjustment for a sheet for which the adjustment has been made, after a lapse of time. The reading apparatus 117 reads the charts using the imaging unit 325 based on an instruction from the CPU 322, stores a reading result in the RAM 324, and notifies the CPU 301 of the reading result via the communication interface 321 and the reading apparatus interface 315. The CPU 301 stores the reading result in the RAM 302, and determines whether both the solid blue and black images fall within a predetermined range. FIG. 11 illustrates the reading result. FIG. 11 illustrates an example where solid blue images having a transfer efficiency of 90% or higher and solid black images having a black rank of 8 or higher are determined as satisfactory. In this chart, the images printed at a secondary transfer voltage of 2650 V to 2800 V satisfy both the conditions. The CPU 301 stores the lowest of the condition-satisfying voltages in the external storage device 311 as an adjustment value of the secondary transfer voltage for that sheet. While, in the present exemplary embodiment, the lowest of the condition-satisfying voltages is stored, the best conditioned one may be employed, for example. In the case of one-sided printing, only the secondary transfer voltage for the front is stored. In the case of two-sided printing, the secondary transfer voltages for the front and back are stored. In the case of two-sided printing, the solid blue and black images on the front and back are printed at positions not overlapping each other to not affect reading.

Figure 10C:
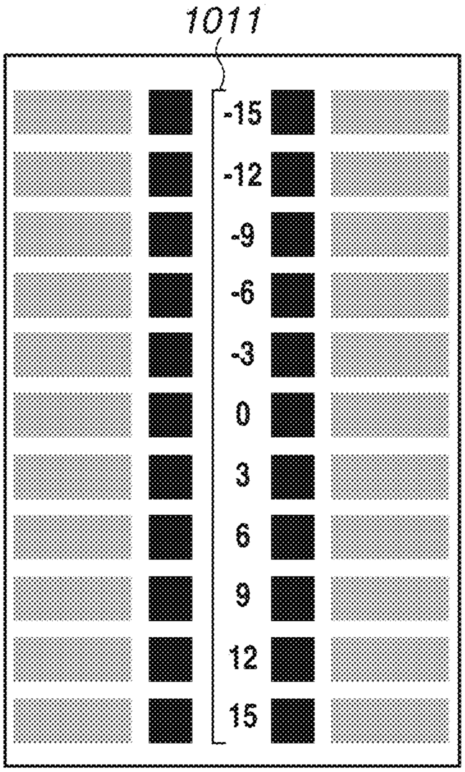
Figure 10D:
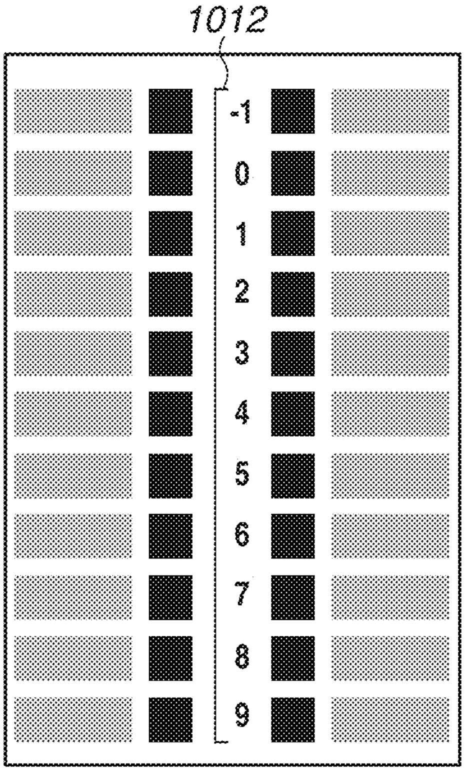

FIGS. 10C and 10D illustrate examples of charts in executing a secondary transfer voltage manual adjustment to be described below. These charts are different from the foregoing ones in that adjustment values 1011 and 1012 are printed so that the user can easily determine adjustment values. The adjustment values indicate voltages stepwise. To facilitate the user to observe the printing states of the patches, the patches are printed in wider areas than those on the automatic adjustment charts of FIGS. 10A and 10B. Moreover, a printable ranges of patches on the manual adjustment charts are wider than those on the automatic adjustment charts. The reason is because of limitations in the mechanical structure and the reading method of the reading apparatus 117 for reading the automatic adjustment charts.

In the present exemplary embodiment, the imaging unit 325 of the reading apparatus 117 reads a printed chart being conveyed. For accurate reading, certain tension is desirably applied to the chart, and for that purpose, the chart has top and bottom margins of a given width. Thus, the automatic adjustment charts each have a patch printable area narrower than that of the manual adjustment charts since the patches are unable to be printed over the entire printable areas of sheets.

FIGS. 12A to 12D illustrate screen examples of the sheet management application for the secondary transfer voltage adjustment.

Figure 12A:
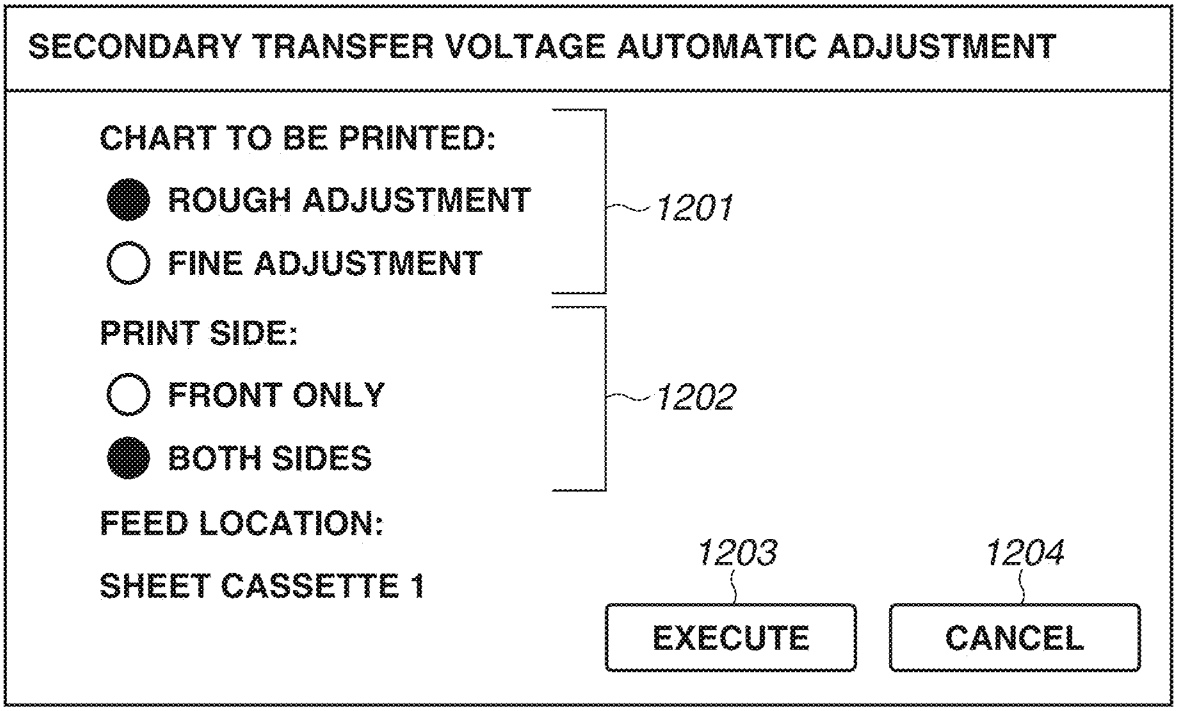
FIGS. 12A, 12B, 12C, and 12D are diagrams illustrating secondary transfer voltage adjustment operation screens of the sheet management application according to the first exemplary embodiment.
Figure 12B:
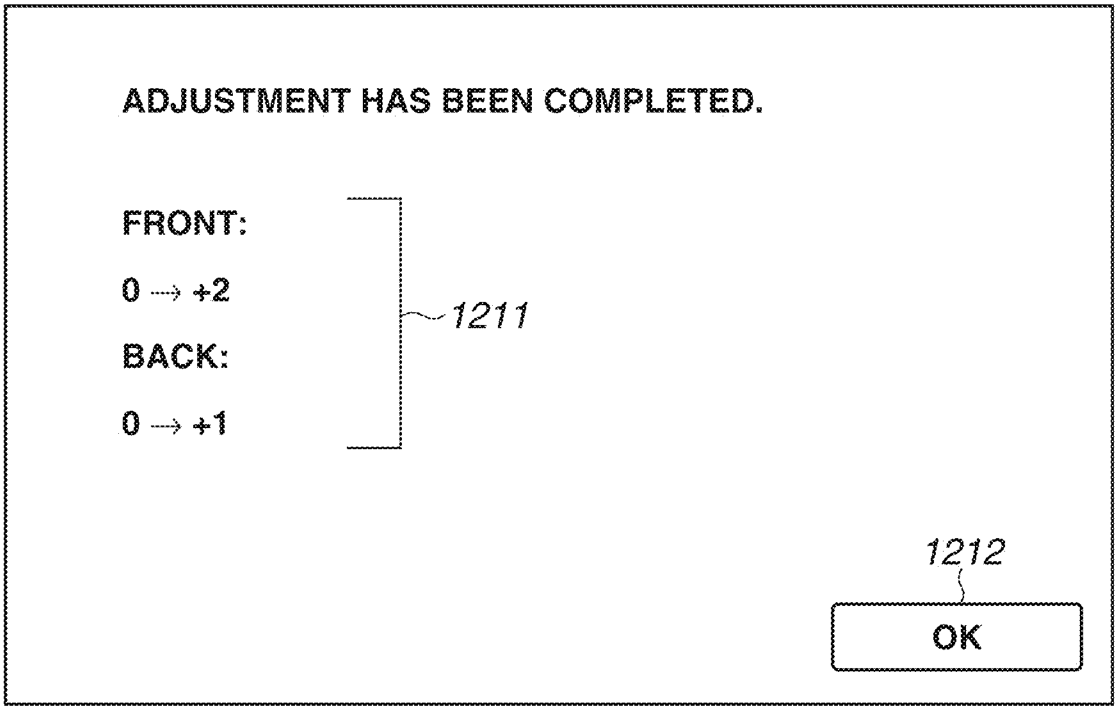
Figure 13:
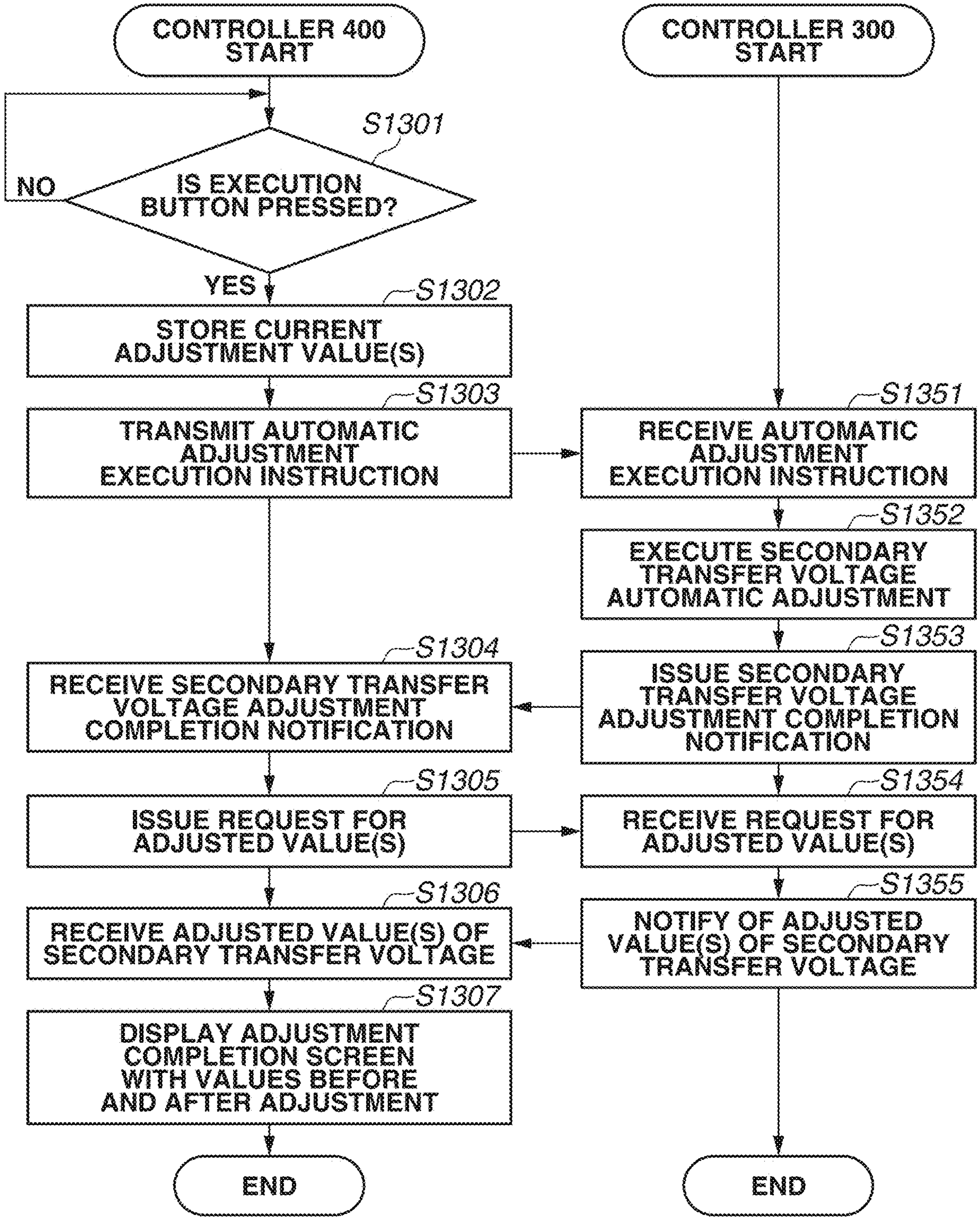
FIG. 13 is a flowchart illustrating secondary transfer voltage automatic adjustment processing according to the first exemplary embodiment.

FIG. 13 is a flowchart illustrating a procedure for executing the secondary transfer voltage automatic adjustment (automatic adjustment procedure). The flowchart for the controller 400 in FIG. 13 is implement by the CPU 401 reading a program (sheet management application program) stored in the ROM 403 into the RAM 402 and executing the program. The flowchart for the controller 300 is implemented by the CPU 301 reading a program stored in the ROM 303 into the RAM 302 and executing the program. Processing involving communication between the controllers 400 and 300 is performed by the CPUs 401 and 301 via the LAN controllers 306 and 406 and the control cable 108. The flowchart is started when an automatic adjustment screen illustrated in FIG. 12A is displayed.

The automatic adjustment screen includes a chart selection area 1201 for selecting which to use for adjustment, a rough adjustment chart or a fine adjustment chart, and a print side selection area 1202 for selecting whether to make an adjustment on only the front or both sides. The automatic adjustment screen includes an execution button 1203 for automatically adjusting the secondary transfer voltage, and a cancel button 1204 for cancelling the adjustment and returning to the feed stage screen 900. In step S1301, the CPU 401 determines whether the execution button 1203 is pressed. If the execution button 1203 is pressed (YES in step S1301), the processing proceeds to step S1302.

In step S1302, the CPU 401 stores the current adjustment value(s) of the secondary transfer voltage in the RAM 402.

In step S1303, the CPU 401 transmits an automatic adjustment execution instruction to the controller 300 along with the settings made in the chart selection area 1201 and the print side selection area 1202.

In step S1351, the CPU 301 receives the automatic adjustment execution instruction. In step S1352, the CPU 301 executes the secondary transfer voltage automatic adjustment. The CPU 301 stores a result of the automatic adjustment in the external storage device 409.

In step S1353, the CPU 301 issues a secondary transfer voltage adjustment completion notification to the sheet management application.

In step S1304, the CPU 401 receives the secondary transfer voltage adjustment completion notification. In step S1305, the CPU 401 issues a request for an adjusted value or values.

In step S1354, the CPU 301 receives the request for the adjusted value(s). In step S1355, the CPU 301 notifies the CPU 401 of the adjusted value(s) of the secondary transfer voltage.

In step S1306, the CPU 401 receives the adjusted value(s) of the secondary transfer voltage. In step S1307, the CPU 401 displays an adjustment completion screen illustrated in FIG. 12B. A display area 1211 is an area displaying the values before and after the adjustment. Here, the display area 1211 indicates that the secondary transfer voltage on the front is adjusted from 0 to +2, and the back from 0 to +1.

Figure 12C:
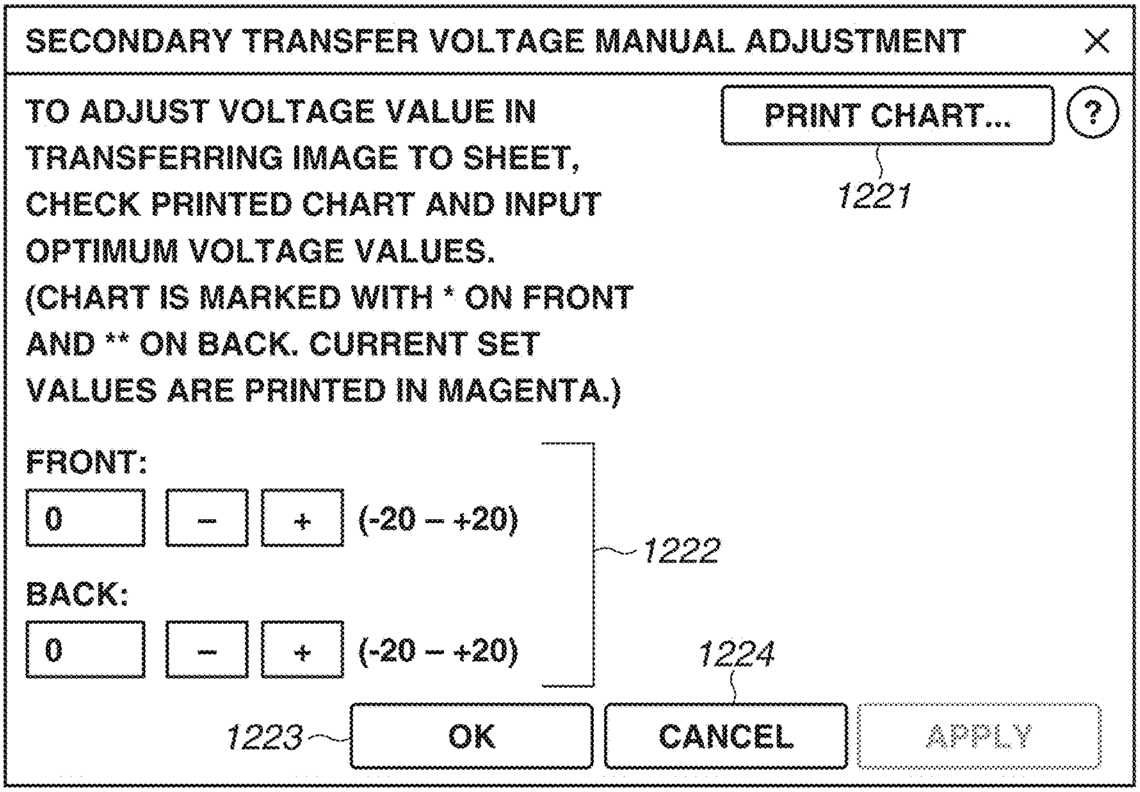
Figure 12D:
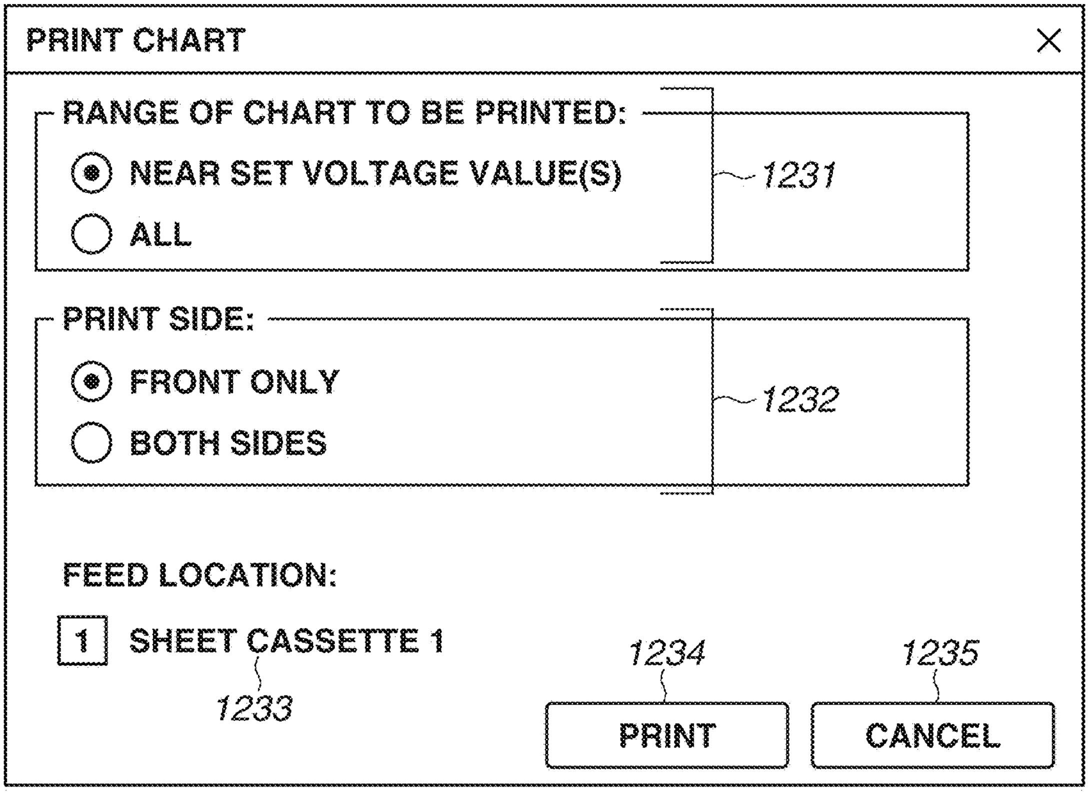
Figure 14:
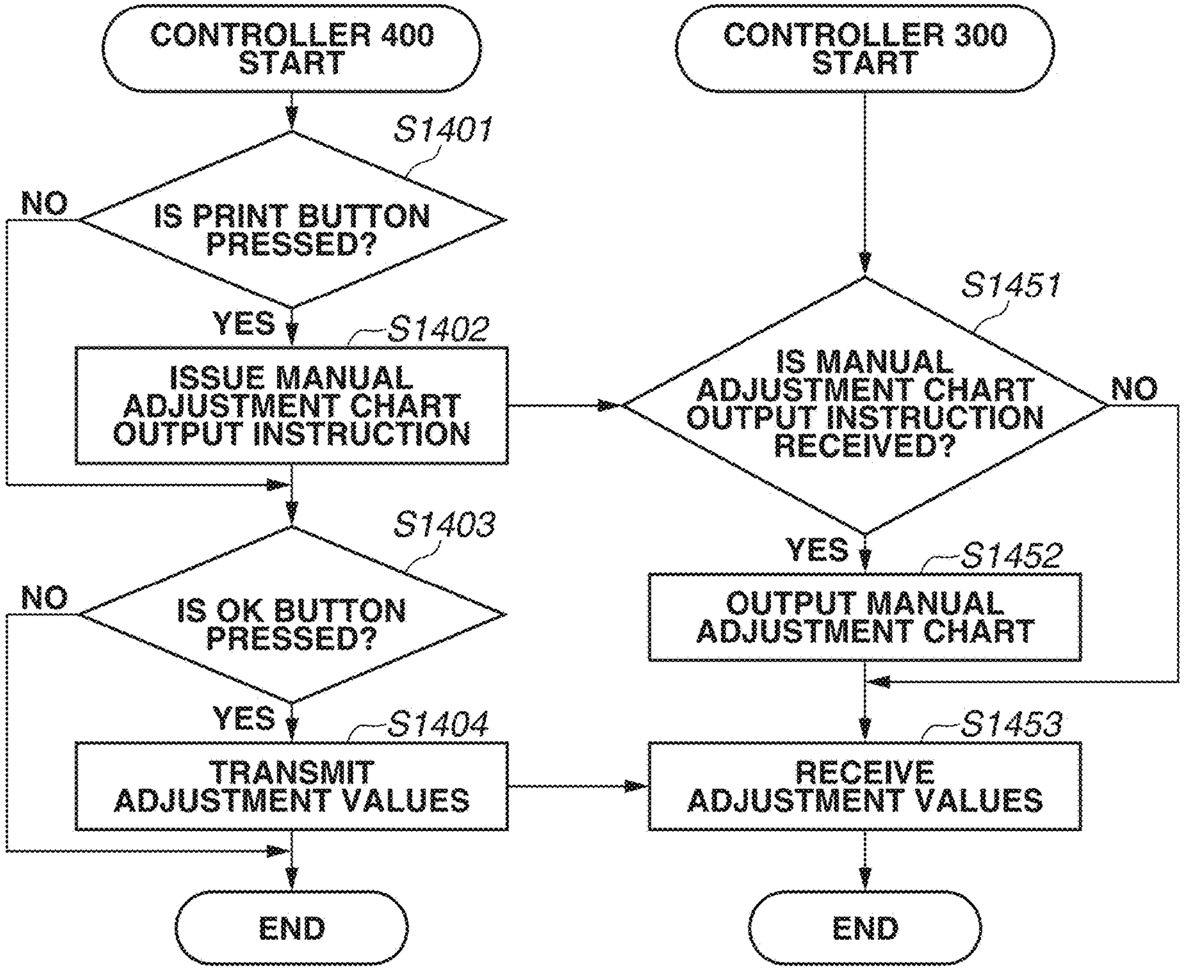
FIG. 14 is a flowchart illustrating secondary transfer voltage manual adjustment processing according to the first exemplary embodiment.

FIG. 14 is a flowchart illustrating a procedure for executing the secondary transfer voltage manual adjustment (manual adjustment procedure). The flowchart for the controller 400 in FIG. 14 is implemented by the CPU 401 reading the program (sheet management application program) stored in the ROM 403 into the RAM 402 and executing the program. Processing involving communication between the controllers 400 and 300 is performed by the CPUs 401 and 301 via the LAN controllers 306 and 406 and the control cable 108. The flowchart is started when a secondary transfer voltage manual adjustment screen (manual adjustment screen) illustrated in FIG. 12C is displayed. The secondary transfer voltage manual adjustment screen illustrated in FIG. 12C includes a manual adjustment chart output button 1221, an adjustment value input area 1222 for inputting adjustment values, an OK button 1223, and a cancel button 1224. The adjustment value input area 1222 displays adjustment values input by the user. If the manual adjustment chart output button 1221 is pressed, a manual adjustment chart setting screen illustrated in FIG. 12D is displayed. As with the automatic adjustment screen, the manual adjustment chart setting screen includes a chart selection area 1231 for selecting which to use for adjustment, a rough adjustment chart or a fine adjustment chart, and a print side selection area 1232 for selecting whether to make an adjustment on only the front or both sides.

In this example, a feed stage is selected using the feed stage buttons 510 to 517. Thus, a chart feed location selection area 1233 displays the selected feed stage. A print button 1234 is a button for giving a manual adjustment chart print instruction to the controller 300. A cancel button 1235 is a button for closing the manual adjustment chart setting screen illustrated in FIG. 12D and returning to the manual adjustment screen illustrated in FIG. 12C.

In step S1401, the CPU 401 determines whether the print button 1234 is pressed. If the print button 1234 is determined to be pressed (YES in step S1401), the processing proceeds to step S1402. If the print button 1234 is not pressed (NO in step S1401), i.e., if a fine adjustment is to be made without outputting a chart, the processing proceeds to step S1403.

In step S1402, the CPU 401 issues a manual adjustment chart output instruction to the controller 300. Here, the CPU

401 also notifies the controller 300 of the information set in the chart selection area 1231, the print side selection area 1232, and the feed location selection area 1233 as chart settings. In step S1451, the CPU 301 of the controller 300 determines whether the manual adjustment chart output instruction is received. If the manual adjustment chart output instruction is determined to be received (YES in step S1451), the processing proceeds to step S1452. In step S1452, the CPU 301 outputs a manual adjustment chart.

In step S1451, if no manual adjustment chart output instruction is determined to be received (NO in step S1451), the processing skips S1452 and proceeds to step S1453.

Steps S1451 to S1453 mean that a manual adjustment is accepted even without reception of the manual adjustment chart output instruction. The description will be given of step S1403 of the sheet management application.

In step S1403, the CPU 401 determines whether a secondary transfer voltage manual adjustment execution instruction is given. In other words, the CPU 401 determines whether the OK button 1223 illustrated in FIG. 12C is pressed. If the OK button 1223 is pressed (YES in step S1403), the processing proceeds to step S1404. If not the OK button 1223 but the cancel button 1224 is pressed (NO in step S1403), the processing ends. In step S1404, the CPU 401 transmits the adjustment values input in the adjustment value input area 1222 to the controller 300. In step S1453, the controller 300 receives the adjustment values, and the CPU 301 stores the received adjustment values in the external storage device 311.

Figure 15:
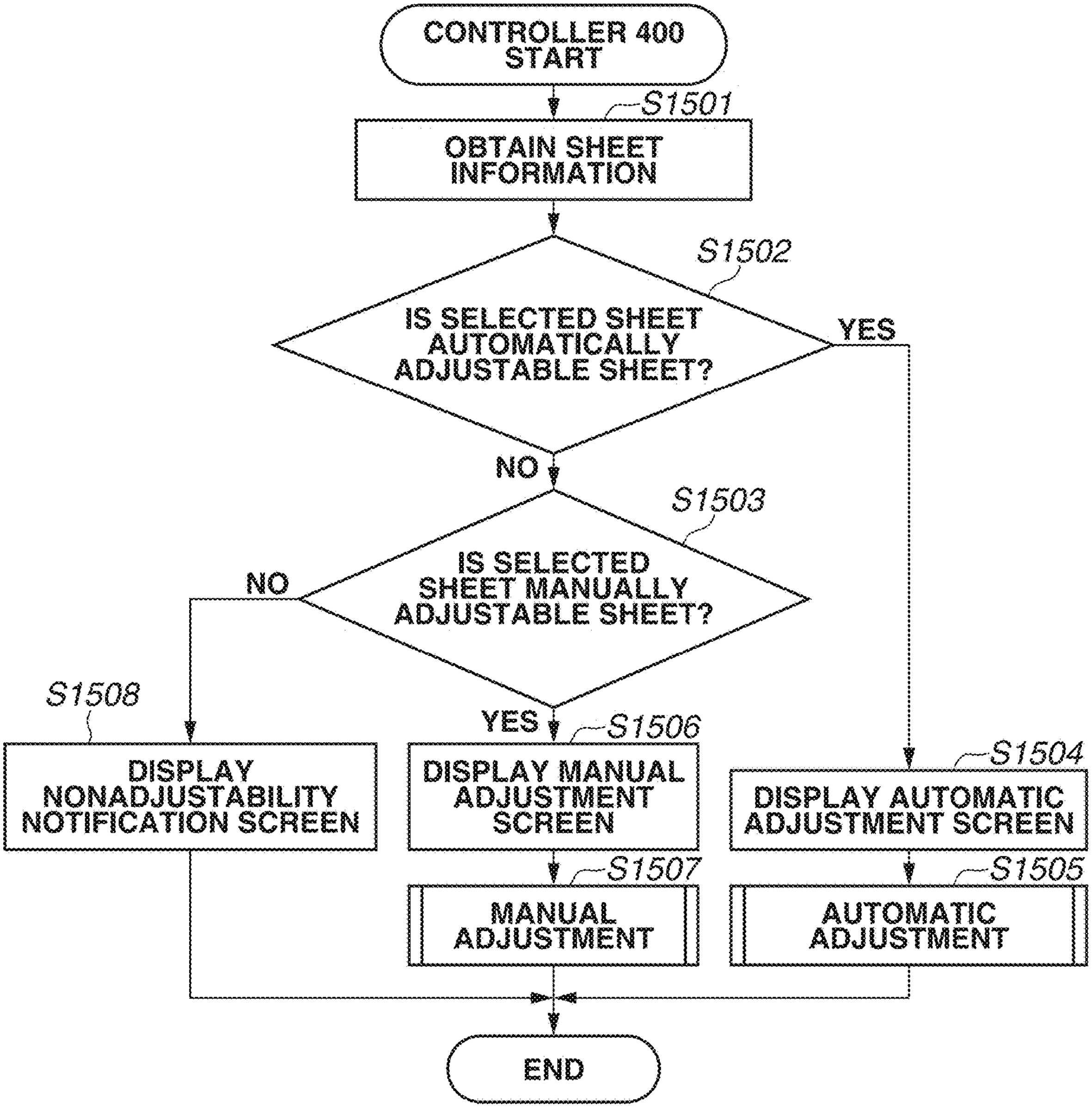
FIG. 15 is a flowchart illustrating processing for selecting and displaying a secondary transfer voltage adjustment screen according to the first exemplary embodiment.

FIG. 15 is a flowchart illustrating a procedure for executing the secondary transfer voltage adjustment, which is characteristic of the present exemplary embodiment. The flowchart of FIG. 15 is implemented by the CPU 401 reading the program (sheet management application program) stored in the ROM 403 into the RAM 402 and executing the program. The procedure is started when the secondary transfer voltage adjustment button 908 is pressed on the feed stage screen of FIG. 9.

If the secondary transfer voltage adjustment button 908 is pressed, then in step S1501, the CPU 401 obtains sheet information about the selected sheet. Here, the sheet information refers to the type and size of the sheet. In step S1502, the CPU 401 determines whether the selected sheet is a sheet for which the secondary transfer voltage is automatically adjustable.

Secondary transfer voltage adjustable sheet information according to the present exemplary embodiment will now be described with reference to FIGS. 16A and 16B. FIG. 16A and FIG. 16B are diagrams illustrating examples of secondary transfer voltage adjustable sheet tables stored in the print control apparatus 102 according to the present exemplary embodiment. The secondary transfer voltage adjustable sheet table lists whether the secondary transfer voltage is adjustable for the sheets of respective types and sizes. For example, as for the sheet types, the secondary transfer voltage is adjustable for high-quality paper and coated paper while the secondary transfer voltage is not adjustable for a film, i.e., transparent sheet. As for the sheet sizes, the secondary transfer voltage is manually adjustable for A5 and A4R sheets and postcard, but not automatically adjustable due to their small height. For, A5R sheets, the secondary transfer voltage is neither automatically nor manually adjustable. For A4 and A3 sheets, the secondary transfer voltage is automatically and manually adjustable. The relationship between the sheets and the adjustability described here is merely an example, and it will be understood that the specifications vary depending on the mechanical structure and the reading method of the reading apparatus 117.

The specifications can also vary depending on the patches and the layout configuration of the adjustment charts.

In step S1502, the CPU 401 refers to the secondary transfer voltage adjustable sheet table, and determines whether the selected sheet is a sheet for which the secondary transfer voltage is automatically adjustable based on the type and size of the selected sheet. If the selected sheet is determined to be the sheet for which the secondary transfer voltage is automatically adjustable (YES in step S1502), the processing proceeds to step S1504. If the selected sheet is determined to not be the sheet for which the secondary transfer voltage is automatically adjustable (NO in step S1502), the processing proceeds to step S1503. In step S1504, the CPU 401 displays the automatic adjustment screen of FIG. 12A on the display device 113. In step S1505, the CPU 401 executes the automatic adjustment procedure described with reference to FIG. 13. The processing ends. In step S1503, the CPU 401 refers to the secondary transfer voltage adjustable sheet table, and determines whether the selected sheet is the sheet for which the secondary transfer voltage is manually adjustable. If the selected sheet is determined to be the sheet for which the secondary transfer voltage is manually adjustable (YES in step S1503), the processing proceeds to step S1506. In step S1506, the CPU 401 displays the manual adjustment screen of FIG. 12C on the display device 113. In step S1507, the CPU 401 executes the manual adjustment procedure described with reference to FIG. 14. The processing ends. In step S1503, if the selected sheet is determined to not be the sheet for which the secondary transfer voltage is manually adjustable, either (NO in step S1503), the processing proceeds to step S1508. In step S1508, the CPU 401 displays a not-illustrated screen for notifying the user of nonadjustability (nonadjustability notification screen) on the display device 113. The processing ends.

As described above, according to the first exemplary embodiment, when the adjustment button 908 is pressed, the automatic adjustment screen is displayed if the selected sheet is the sheet for which the secondary transfer voltage is automatically adjustable based on the sheet type and the size information. If not, the manual adjustment screen is displayed. When the adjustment button 908 is pressed, the automatic adjustment is thus enabled if the selected sheet is the sheet for which the secondary transfer voltage is automatically adjustable based on the sheet type and the sheet information, and the automatic adjustment is disabled if the selected sheet is the sheet for which the secondary transfer voltage is not automatically adjustable. This can prevent an adjustment from being made using a sheet of a size where a proper adjustment cannot be made.

In the first exemplary embodiment, a procedure for displaying the automatic adjustment screen if the selected sheet is the sheet for which the secondary transfer voltage is automatically adjustable, and displaying the manual adjustment screen if not, using a single adjustment button has been described. In a second exemplary embodiment, a case where there are different adjustment buttons for automatic adjustment and manual adjustment will be described.

Figure 17:
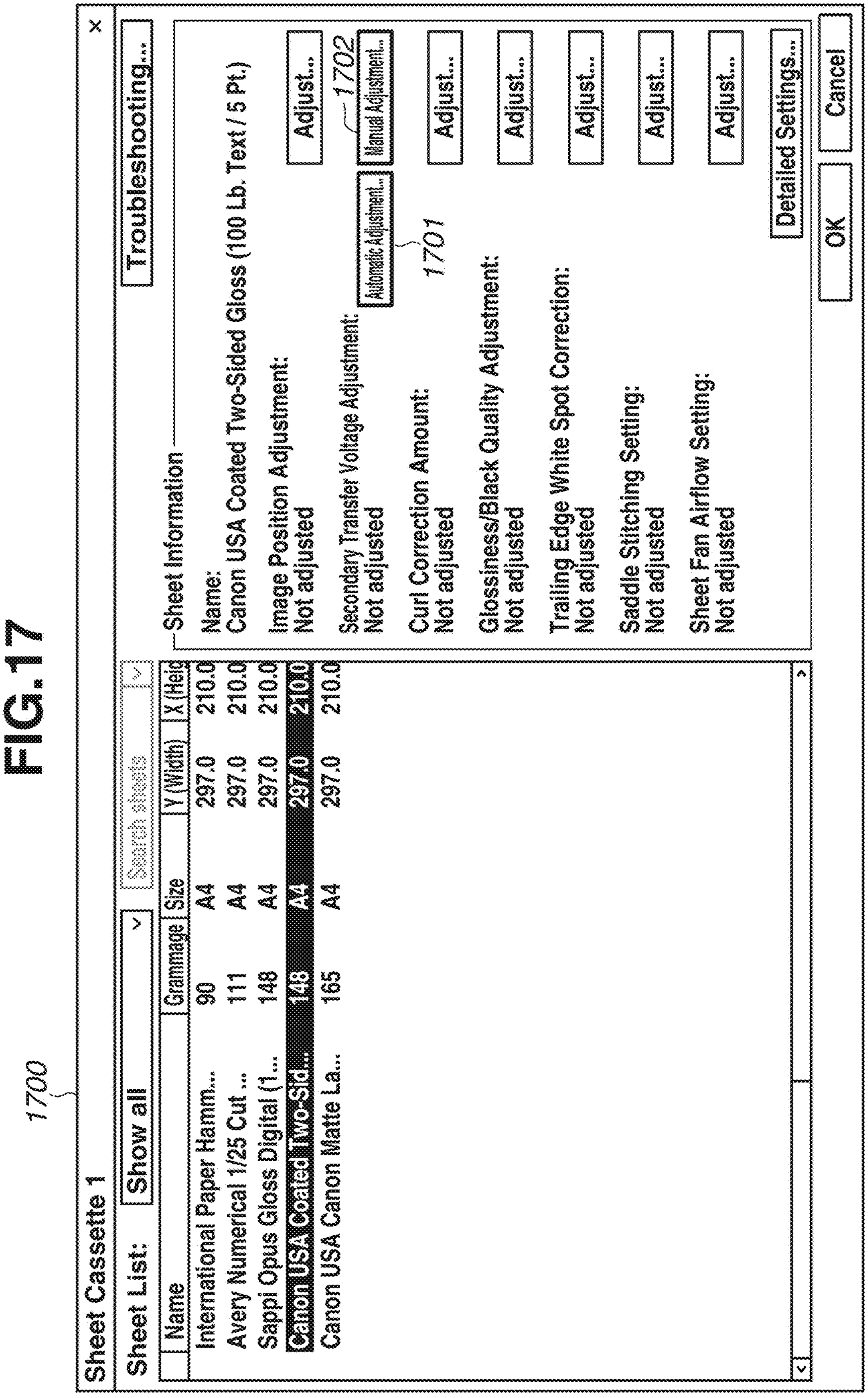
FIG. 17 is a diagram illustrating a feed stage screen displayed when a feed stage button on a top screen is pressed in a second exemplary embodiment.

FIG. 17 illustrates an example of a feed stage screen 1700 according to the present exemplary embodiment. The screen has a similar configuration to that of the feed stage screen 900 according to the first exemplary embodiment. Thus, a description of similar portions will be omitted. A difference is that there are two adjustment buttons for making a secondary transfer voltage adjustment, namely, an automatic adjustment button 1701 and a manual adjustment button 1702.

Figure 18:
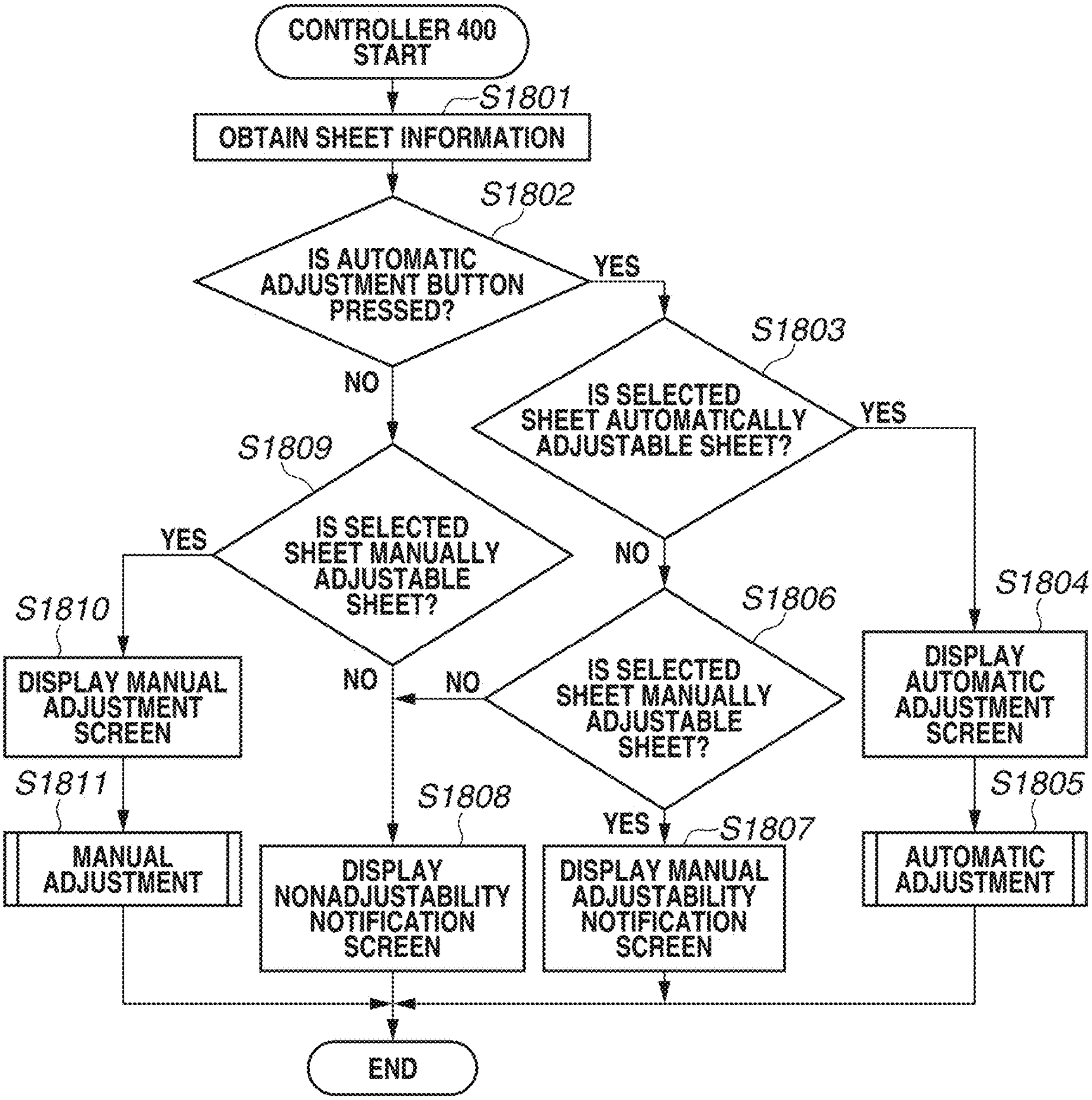
FIG. 18 is a flowchart illustrating processing for selecting and displaying a secondary transfer voltage adjustment screen according to the second exemplary embodiment.

FIG. 18 is a flowchart illustrating a procedure for executing the secondary transfer voltage adjustment, which is characteristic of the present exemplary embodiment. The flowchart for a controller 400 in FIG. 18 is implemented by a CPU 401 reading a program (sheet management application program) stored in a ROM 403 into a RAM 402 and executing the program. The procedure is started when either the automatic adjustment button 1701 or the manual adjustment button 1702 for secondary transfer voltage adjustment is pressed on the feed stage screen 1700 of FIG. 17. A description of similar portions to those of the flowchart of FIG. 15 according to the first exemplary embodiment will be omitted.

Step S1801 is similar to step S1501. In step S1802, the CPU 401 determines whether the pressed adjustment button is the automatic adjustment button 1701 or the manual adjustment button 1702. If the automatic adjustment button 1701 is pressed (YES in step S1802), the processing proceeds to step S1803. Step S1803 is similar to step S1502. In step S1803, if the selected sheet is determined to be a sheet for which the secondary transfer voltage is automatically adjustable (YES in step S1803), the processing proceeds to step S1804. Steps S1804 and S1805 are similar to steps S1504 and S1505, respectively. The automatic adjustment is completed, and the processing ends. In step S1803, if the selected sheet is the sheet for which the secondary transfer voltage is not automatically adjustable (NO in step S1803), the processing proceeds to step S1806. Step S1806 is similar to step S1503, and the CPU 401 determines whether the selected sheet is the sheet for which the secondary transfer voltage is manually adjustable. If the selected sheet is determined to be the sheet for which the secondary transfer voltage is manually adjustable (YES in step S1806), the processing proceeds to step S1807. In step S1807, the CPU 401 display a screen for notifying that the selected sheet is the sheet for which the secondary transfer voltage is not automatically adjustable but is manually adjustable (manual adjustability notification screen; not illustrated). The processing ends. In step S1806, if the selected sheet is determined to not be the sheet for which the secondary transfer voltage is manually adjustable, either (NO in step S1806), the processing proceeds to step S1808. Step S1808 is similar to step S1508, and the CPU 401 displays the screen notifying the user of the nonadjustability. The processing ends.

In step S1802, if the manual adjustment button 1702 is pressed (NO in step S1802), the processing proceeds to step S1809. Step S1809 is similar to steps S1503 and S1803, and the CPU 401 determines whether the selected sheet is the sheet for which the secondary transfer voltage is manually adjustable. In step S1809, if the selected sheet is determined to be the sheet for which the secondary transfer voltage is manually adjustable (YES in step S1809), the processing proceeds to step S1810. Steps S1810 and S1811 are similar to steps S1506 and S1507, respectively. The manual adjustment is completed, and the processing ends. In step S1809, if the selected sheet is the sheet for which the secondary transfer voltage is not manually adjustable (NO in step S1809), the processing proceeds to the foregoing step S1808.

As described above, according to the second exemplary embodiment, there are respective different adjustment buttons for the automatic adjustment and the manual adjustment. If the selected sheet is determined to not be the sheet for which the secondary transfer voltage is adjustable corresponding to the pressed adjustment button based on the sheet type and the size information, the user is notified of the nonadjustability. This can prevent an adjustment from being made using a sheet of a size where a proper adjustment cannot be made.

Moreover, if the selected sheet has a size where the automatic adjustment cannot be made but the manual adjustment can be made, the user can be notified of the adjustability and prompted to execute the manual adjustment.

In the procedures described in the first and second exemplary embodiments, whether the selected sheet is the sheet for which the secondary transfer voltage is adjustable is determined after the pressing of an adjustment button, and if the selected sheet is not the sheet for which the secondary transfer voltage is adjustable, a screen notifying the user of the nonadjustability is displayed. However, as a third exemplary embodiment, the following method may be employed: a similar determination is made on the adjustability not after the pressing of the adjustment button but when displaying the feed stage screen 900 or 1700 including the adjustment buttons, and if the selected sheet is not the sheet for which the secondary transfer voltage is adjustable, gray out or hide the adjustment button so that the user is unable to press the adjustment button.

Similar effects can thereby be obtained.

The first to third exemplary embodiments have been described on the assumption that a sheet is selected in the sheet list display area of the feed stage screen 900 or 1700. In a fourth exemplary embodiment, a case where a sheet for which the secondary transfer voltage is to be adjusted is not selected when an adjustment button is pressed will be described.

The present exemplary embodiment deals with a procedure where the user selects a sheet for which the secondary transfer voltage is to be adjusted from the sheet list display area after the pressing of an intended adjustment button.

Figure 19:
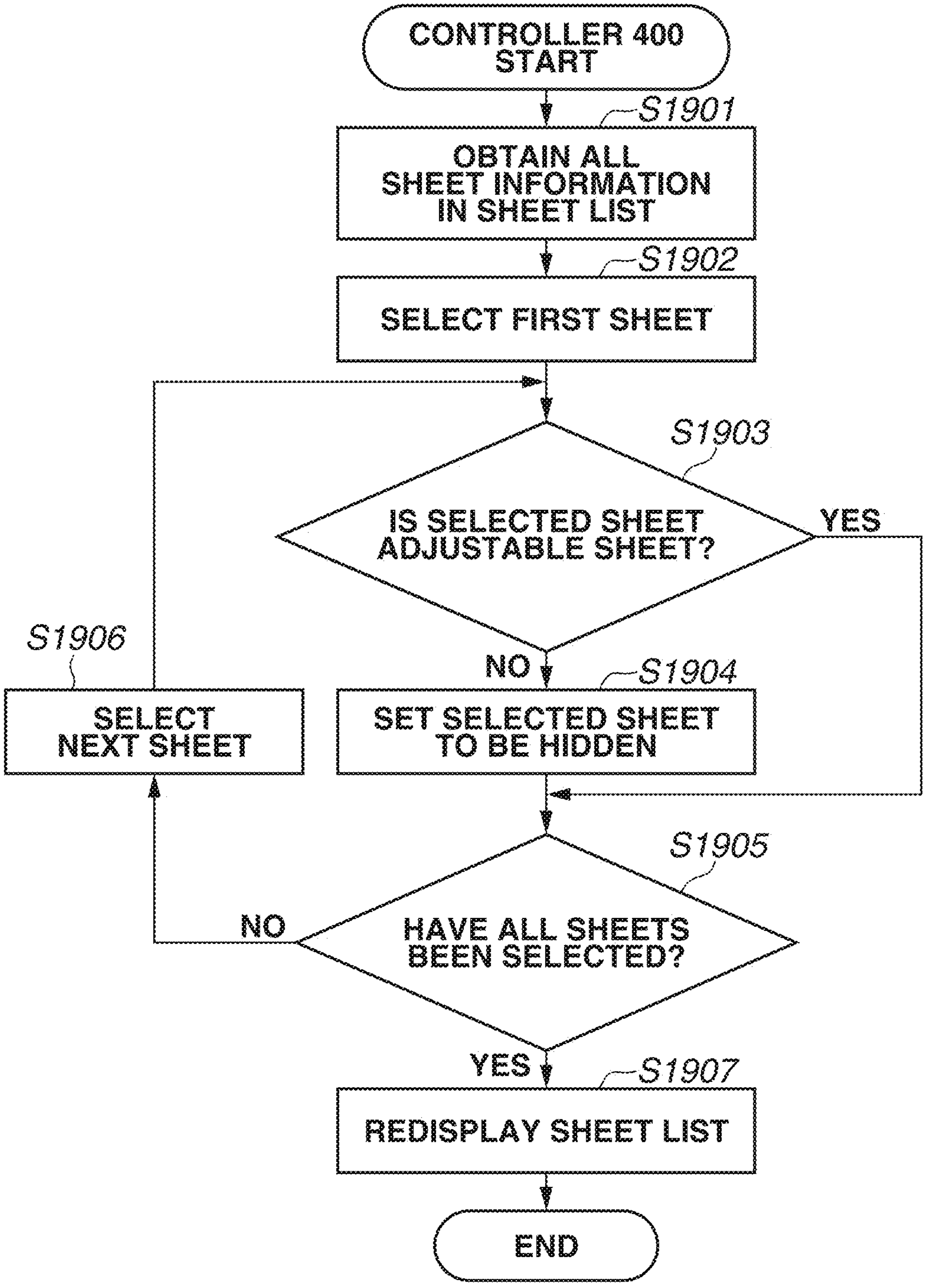
FIG. 19 is a flowchart illustrating redisplay of a sheet list after pressing of an adjustment button according to a fourth exemplary embodiment.

FIG. 19 is a flowchart illustrating a procedure for updating and displaying a sheet list when an adjustment button is pressed, which is characteristic of the present exemplary embodiment. The flowchart for a controller 400 in FIG. 19 is implemented by a CPU 401 reading a program (sheet management application program) stored in a ROM 403 into a RAM 402 and executing the program. The procedure is started when any of the adjustment buttons 908, 1701, and 1702 is pressed without a sheet being selected in FIG. 9 or 17.

In step S1901, the CPU 401 obtains all the sheet information in the sheet list displayed in the sheet list display area.

In step S1902, the CPU 401 selects the first sheet in the sheet list.

In step S1903, the CPU 401 determines whether the selected sheet is the sheet for which the secondary transfer voltage is adjustable corresponding to the pressed adjustment button. For example, if the adjustment button 908 or the automatic adjustment button 1701 is pressed, the CPU 401 refers to the secondary transfer voltage adjustable sheet tables of FIGS. 16A and 16B as described above and determines whether the selected sheet is the sheet for which the secondary transfer voltage is automatically adjustable. If the adjustment button 908 is pressed and the selected sheet is determined to not be the sheet for which the secondary transfer voltage is automatically adjustable or if the manual adjustment button 1702 is pressed, the CPU 401 similarly determines whether the selected sheet is the sheet for which the secondary transfer voltage is manually adjustable. In step S1903, if the selected sheet is determined to be the sheet for which the secondary transfer voltage is adjustable (YES in step S1903), the processing proceeds to step S1905. If the selected sheet is determined to not be the sheet for which the secondary transfer voltage is adjustable (NO in step S1903), the processing proceeds to step S1904. In step S1904, the CPU 401 sets the selected sheet to be hidden. In step S1905, the CPU 401 determines whether all the sheets have been selected. If there is a sheet yet to be selected (NO in step S1905), the processing proceeds to step S1906. In step S1906, the CPU 401 selects the next sheet in the sheet list. The processing returns to step S1903. In step S1905, if all the sheets have been selected (YES in step S1905), the processing proceeds to step S1907. In step S1907, the CPU 401 displays only the sheet information excluding the sheet(s) set to be hidden in step S1904 in the sheet list. The processing ends.

After the redisplay of the sheet list, the screen may transition to the corresponding adjustment screen. Alternatively, the user may select a sheet and press the adjustment button again to enter a procedure for making the adjustment.

As described above, according to the fourth exemplary embodiment, if an adjustment button is pressed without selecting a sheet, only sheets for which the secondary transfer voltage is adjustable are displayed on the sheet list. This can ensure that the user selects a sheet for which the secondary transfer voltage is adjustable.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A non-transitory computer-readable storage medium storing a program to cause a computer to perform a method for controlling an information processing apparatus, the method comprising:

receiving an adjustment value from a user;

causing a printing apparatus to print an image on a sheet, convey the sheet on which the image is printed to a reading apparatus, and to perform a first adjustment based on the image read by the reading apparatus;

causing the printing apparatus to perform a second adjustment based on the received adjustment value;

preventing the first adjustment from being performed for a sheet of a size where the first adjustment is not properly performed from among sheets on which the image is able to be printed by the printing apparatus; and not preventing the second adjustment from being performed for the sheet of the size where the first adjustment is not properly performed, wherein the first adjustment and the second adjustment are performed for a secondary transfer voltage of the printing apparatus.

2. The non-transitory computer-readable storage medium according to claim 1, the method further comprising:

selecting a sheet; and determining whether the selected sheet has the size where the first adjustment is not properly performed, wherein, in a case where it is determined that the selected sheet is the sheet of the size where the first adjustment is not properly performed, preventing includes preventing the first adjustment from being performed.

3. The non-transitory computer-readable storage medium according to claim 2, the method further comprising causing a display to display an adjustment-instructing object, wherein, in a case where the displayed adjustment-instructing object is selected and it is determined that the selected sheet has a size where the first adjustment is properly performed, a screen for the first adjustment is displayed on the display, and wherein, in a case where the displayed adjustment-instructing object is selected and it is determined that the selected sheet has the size where the first adjustment is not properly performed, a screen for the second adjustment is displayed on the display.

4. The non-transitory computer-readable storage medium according to claim 1, the method further comprising:

selecting a sheet; and causing a display to display a first object for the first adjustment and to display a second object for performing the second adjustment, wherein, in a case where it is determined that the selected sheet is the sheet of the size where the first adjustment is not properly performed, selection of the first object is disabled and selection of the second object is enabled.

5. The non-transitory computer-readable storage medium according to claim 1, the method further comprising:

selecting a sheet; and causing, in the case where it is determined that the selected sheet is the sheet of the size where the first adjustment is not properly performed, a display to display a second object for performing the second adjustment and not to display a first object for the first adjustment.

6. A method for controlling an information processing apparatus, the method comprising:

receiving an adjustment value from a user;

causing a printing apparatus to print an image on a sheet, convey the sheet on which the image is printed to a reading apparatus, and to perform a first adjustment based on the image read by the reading apparatus;

causing the printing apparatus to perform a second adjustment based on the received adjustment value;

preventing the first adjustment from being performed for a sheet of a size where the first adjustment is not properly performed from among sheets on which the image is able to be printed by the printing apparatus; and not preventing the second adjustment from being performed for the sheet of the size where the first adjustment is not properly performed, wherein the first adjustment and the second adjustment are performed for a secondary transfer voltage of the printing apparatus.

7. An information processing apparatus comprising:

a processor and a memory in communication with each other and to perform operations including:

receiving an adjustment value from a user, causing a printing apparatus to print an image on a sheet, convey the sheet on which the image is printed to a reading apparatus, and to perform a first adjustment based on the image read by the reading apparatus, causing the printing apparatus to perform a second adjustment based on the received adjustment value, preventing the first adjustment from being performed for a sheet of a size where the first adjustment is not properly performed from among sheets on which the image is able to be printed by the printing apparatus, and not preventing the second adjustment from being performed for the sheet of the size where the first adjustment is not properly performed, wherein the first adjustment and the second adjustment are performed for a secondary transfer voltage of the printing apparatus.

* * * * *